United States Patent
Obayashi et al.

(10) Patent No.: US 9,278,625 B2
(45) Date of Patent: Mar. 8, 2016

(54) POWER SUPPLY APPARATUS FOR VEHICLES THAT SELECTS BETWEEN CONDUCTIVE AND NON-CONDUCTIVE POWER TRANSFER

(75) Inventors: Kazuyoshi Obayashi, Chita-gun (JP); Akira Sakamoto, Obu (JP)

(73) Assignee: DENSO CORPORATION, Kariya (JP)

( * ) Notice: Subject to any disclaimer, the term of this patent is extended or adjusted under 35 U.S.C. 154(b) by 740 days.

(21) Appl. No.: 13/328,555

(22) Filed: Dec. 16, 2011

(65) Prior Publication Data
US 2012/0153717 A1  Jun. 21, 2012

(30) Foreign Application Priority Data

Dec. 16, 2010 (JP) .................................. 2010-280813
Mar. 21, 2011 (JP) .................................. 2011-061864

(51) Int. Cl.
  *B60L 11/18* (2006.01)
  *B60L 1/00* (2006.01)
  (Continued)

(52) U.S. Cl.
  CPC ............ *B60L 11/1816* (2013.01); *B60L 1/003* (2013.01); *B60L 1/06* (2013.01); *B60L 7/14* (2013.01); *B60L 11/005* (2013.01); *B60L 11/14* (2013.01); *B60L 11/182* (2013.01); *B60L 11/1846* (2013.01); *B60L 11/1868* (2013.01); *B60L 15/007* (2013.01); *B60L 2210/10* (2013.01); *B60L 2210/30* (2013.01); *B60L 2210/40* (2013.01); *B60L 2240/28* (2013.01); *B60L 2240/34* (2013.01); *B60L 2240/36* (2013.01); *B60L 2240/441* (2013.01); *B60L 2250/16* (2013.01); *Y02T 10/70* (2013.01);
  (Continued)

(58) Field of Classification Search
  None
  See application file for complete search history.

(56) References Cited

U.S. PATENT DOCUMENTS 5,670,851 A     9/1997  Numazaki
8,810,205 B2 *  8/2014  Ichikawa ..................... 320/138
(Continued)

FOREIGN PATENT DOCUMENTS

JP   A-8-308150    11/1996
JP   A-9-322412    12/1997
(Continued)

OTHER PUBLICATIONS

Office Action dated Jan. 31, 2014 issued in U.S. Appl. No. 13/094,232.
(Continued)

*Primary Examiner* — Rexford Barnie
*Assistant Examiner* — David Shiao
(74) *Attorney, Agent, or Firm* — Oliff PLC

(57) ABSTRACT

A power supply apparatus for vehicles is provided. This apparatus includes a battery mounted on a vehicle as well as first and second power transferring means and a power conversion unit. The first power transferring means transfers power between the battery and a first power supply section placed outside the vehicle, in a state where the battery is electrically connected to the power supply section. The second power transferring means transfers power between the battery and the power supply section placed outside the vehicle, in a state where the battery is electromagnetically connected to a second power supply section. The power conversion unit is used commonly in both the first and second power transferring means and used for transferring the power between the battery and the first power supply section and for transferring the power between the battery and the second power supply section.

14 Claims, 15 Drawing Sheets

(51) Int. Cl.
*B60L 1/06* (2006.01)
*B60L 7/14* (2006.01)
*B60L 11/00* (2006.01)
*B60L 11/14* (2006.01)
*B60L 15/00* (2006.01)

(52) U.S. Cl.
CPC ......... *Y02T 10/7005* (2013.01); *Y02T 10/7022* (2013.01); *Y02T 10/7066* (2013.01); *Y02T 10/7077* (2013.01); *Y02T 10/7216* (2013.01); *Y02T 10/7241* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01); *Y10T 307/50* (2015.04)

(56) References Cited

U.S. PATENT DOCUMENTS

| | | | |
|---|---|---|---|
| 2002/0024221 A1 | 2/2002 | Grewe et al. | |
| 2004/0041568 A1 | 3/2004 | Yang | |
| 2009/0067205 A1 | 3/2009 | Oyobe et al. | |
| 2009/0121659 A1 | 5/2009 | Oyobe et al. | |
| 2010/0033018 A1* | 2/2010 | Fukasawa et al. | 307/80 |
| 2010/0045450 A1* | 2/2010 | Suzuki et al. | 340/438 |
| 2010/0063660 A1 | 3/2010 | Uchida | |
| 2010/0320964 A1* | 12/2010 | Lathrop et al. | 320/109 |
| 2011/0187184 A1 | 8/2011 | Ichikawa | |
| 2012/0043931 A1* | 2/2012 | Terao et al. | 320/108 |
| 2012/0306439 A1* | 12/2012 | Ichikawa et al. | 320/108 |

FOREIGN PATENT DOCUMENTS

| | | | |
|---|---|---|---|
| JP | A-10-191506 | | 7/1998 |
| JP | A-2001-8380 | | 1/2001 |
| JP | B2-3477850 | | 12/2003 |
| JP | A-2007-097341 | | 4/2007 |
| JP | A-2007-195336 | | 8/2007 |
| JP | A-2007-318970 | | 12/2007 |
| JP | A-2008-172857 A | | 7/2008 |
| JP | A-2008-220130 | | 9/2008 |
| JP | 2010093957 A | * | 4/2010 |
| JP | A-2010-081672 | | 4/2010 |
| WO | WO 2008143155 A1 | * | 11/2008 |
| WO | WO 2009/116311 A1 | | 9/2009 |
| WO | WO 2010/131348 A1 | | 11/2010 |
| WO | WO 2010131346 A1 | * | 11/2010 |
| WO | WO 2010131349 A1 | * | 11/2010 |

OTHER PUBLICATIONS

Japanese Office Action issued in Japanese Patent Application No. 2010-280813 dated Jul. 2, 2013 (w/translation).
May 1, 2012 Notification of Reasons for Rejection issued in Japanese Patent Application No. 2010-239339 (with translation).
U.S. Appl. No. 13/094,232, filed Apr. 26, 2011 in the name of Obayashi et al.
Office Action dated Feb. 25, 2014 issued in Japanese Patent Application No. 2012-145768 (w/English Translation).
Office Action issued in Japanese Application No. 2012-145768 dated Jun. 11, 2013 (with partial translation).
Apr. 17, 2012 Notification of Reasons for Rejection issued in Japanese Patent Application No. 2010-101701 (with translation).
Japanese Office Action issued in Japanese Application No. 2010-280813 dated Nov. 6, 2012 (w/translation).

* cited by examiner

POWER SUPPLY APPARATUS FOR VEHICLES THAT SELECTS BETWEEN CONDUCTIVE AND NON-CONDUCTIVE POWER TRANSFER

CROSS-REFERENCE TO RELATED APPLICATION

This application is based on and claims the benefit of priorities from earlier Japanese Patent Application Nos. 2010-280813 and 2011-061864 filed Dec. 16, 2010 and Mar. 21, 2011, respectively, the descriptions of which are incorporated herein by reference.

BACKGROUND OF THE INVENTION

1. Technical Field of the Invention

The present invention relates to a power supply apparatus for vehicles, which transfers electrical power between a battery installed in a vehicle and a power supply outside the vehicle.

2. Related Art

Vehicle power supply systems are well known. As one of such vehicle power supply systems of conventional art, JP-A-2008-220130 discloses a vehicle power supply system that includes two charging means which are a conductive charging means and an inductive charging means. The conductive charging means allows transfer of electrical power between a battery installed in the vehicle and a residential power supply, which are in an electrically and physically connected state. The inductive charging means allows transfer of electrical power between the battery and an inductive charger outside the vehicle, which are in a magnetically connected state.

In the conductive charging means, upon connection between the residential power supply and the vehicle via a connector, commercial AC power from the residential power supply is converted into DC power by an inverter to charge the battery. In the inductive charging means, self-induction electromotive force is caused in a pad of the inductive charger. The self-induction electromotive force causes mutual-induction electromotive force in a vehicle-side port. The voltage induced in the port is rectified into DC voltage by a rectifier circuit to charge the battery. Thus, the vehicle power supply system disclosed in the patent document JP-A-2008-220130 enables two types of charging, i.e. conductive charging and inductive charging.

However, in the vehicle power supply system disclosed in the patent document JP-A-2008-220130, the conductive charging means includes an inverter used for power conversion, while the inductive charging means also includes a rectifier circuit used for power conversion (rectification). In other words, each charging means has a power converter of its own. Therefore, the system as a whole has a problematically large size occupying a large space when installed in a vehicle. The large size of the system also raises a problem of increasing weight and cost.

In addition in the vehicle power supply system disclosed in JP-A-2008-220130, two charging means are individually provided for the conductive charging means and the inductive charging means, for use in charging electrical power to the power storage section. Therefore, the charging means as a whole have a large size, which leads to increase of cost of the system.

SUMMARY

In light of the problems set forth above and, in a vehicle power supply system which is able to selectively use a conductive process or a non-contact process in transferring electrical power between a battery of a vehicle and a power supply section outside the vehicle, it is desired to provide a vehicle power supply system including a simplified power converter of a reduced weight and cost and having good installability to a vehicle.

In light of the problem set forth above, in a power supply system which is able to charge electrical power both in a conductive (contact) manner and in a non-contact manner, it is also desired to provide a power supply system whose size is reduced by sharing the components.

According to one exemplary embodiment, a power supply apparatus for vehicles includes a battery mounted on a vehicle; first power transferring means for transferring power between the battery and a first power supply section placed outside the vehicle, in a state where the battery is electrically connected to the power supply section; second power transferring means for transferring power between the battery and the power supply section placed outside the vehicle, in a state where the battery is electromagnetically connected to a second power supply section; and a power conversion unit used commonly in both the first and second power transferring means and used for transferring the power between the battery and the first power supply section and for transferring the power between the battery and the second power supply section.

According to this exemplary embodiment, a single power conversion unit is shared between individual charging means, unlike the system disclosed in JP-A-2008-220130 as set forth above in which each of charging means is provided with a power converter of its own. Thus, in the vehicle power supply system, the power conversion unit is simplified to thereby enhance installability of the system to a vehicle and reduce weight and cost of the system.

It is preferred that the power conversion unit is configured to interactively transfer the power from the battery to each of the first and second power supply sections and from each of the first and second power supply sections to the battery. In this case, the electrical power is discharged not only from the power supply part to the battery but also from the battery to the power supply part when electrical power is needed by the power supply part.

It is also preferred that the vehicle is provided with a motor section driven by power of which mode is converted from the power of the battery, and the power conversion unit is used in common to convert the mode of the power of the battery. In this case, use of the motor power conversion part installed in the vehicle can omit new installation of the power conversion part in the conductive power transfer means and in the non-contact power transfer means. Thus, in the vehicle power supply system, the power conversion part is simplified to thereby enhance installability of the system to a vehicle and reduce weight and cost of the system.

The vehicle power supply system disclosed in JP-A-2008-220130 set forth above includes an inductive charge selection switch. Of the conductive-type charging and the inductive-type charging, when the user wishes to use the inductive-type charging in the system, the user presses the selection switch to request execution of the inductive-type charging. This, however, increases the work of the user and thus deteriorates usability.

This drawback is also overcome by the power supply apparatus of further comprising a control section that controls operations of the first and second power transferring means, wherein the control section includes first detecting means for detecting that the first power transferring means is preparing for transferring the power during an operation of the second power transferring means, stop means for stopping the operation of the second power transferring means when the first detecting means detects that the first power transferring means is preparing for the power transfer, second detecting means for detecting that the first power transferring means has electrically connected the battery and the power supply section, and allowing means for allowing the first power transferring means to operate when the second detecting means detects the electrical connection.

That is, the user does not have to select a type of charging by pressing a selection switch or the like every time the user charges the battery. Specifically, for example, detecting that the conductive power transfer means is preparing for the transfer of electrical power, the controller automatically switches the power transfer conducted through the non-contact power transfer means to the power transfer conducted through the conductive power transfer means. Thus, the vehicle power supply system has good usability.

According to another exemplary embodiment, a power supply apparatus for vehicles includes a battery mounted on a vehicle; first power transferring means for transferring power between the battery and a first power supply section placed outside the vehicle, in a state where the battery is electrically connected to the power supply section; second power transferring means for transferring power between the battery and the power supply section placed outside the vehicle, in a state where the battery is electromagnetically connected to a second power supply section; and a control section that controls operations of the first and second power transferring means, wherein the control section includes first detecting means for detecting that the first power transferring means is preparing for transferring the power during an operation of the second power transferring means, stop means for stopping the operation of the second power transferring means when the first detecting means detects that the first power transferring means is preparing for the power transfer, second detecting means for detecting that the first power transferring means has electrically connected the battery and the power supply section, and allowing means for allowing the first power transferring means to operate when the second detecting means detects the electrical connection According to this exemplary embodiment, similar to the fourth aspect described above, the user does not have to select a type of charging by pressing a selection switch or the like every time the user charges the battery. Specifically, for example, detecting that the conductive power transfer means is preparing for the transfer of electrical power, the controller automatically switches the power transfer conducted through the non-contact power transfer means to the power transfer conducted through the conductive power transfer means. Thus, the vehicle power supply system has good usability.

According to still another exemplary embodiment, the controller switches the operation transfer relays to activate the step up/down circuit. Thus, the electrical power supplied from the AC power supply is rectified by the rectifier. Meanwhile, the voltage of the electrical power is regulated by the step up/down circuit. In this way, the power supply system functions as a contact-type power supply system that supplies electrical power to the first battery in a contacting manner.

Also, the controller switches the operation transfer relays to activate the primary resonance circuit. Thus, the electrical power supplied from the AC power supply is rectified by the rectifier. Meanwhile, self-induction electromotive force is generated in the primary resonance circuit so that the second battery is charged via the secondary resonance circuit. In this way, the power supply system functions as a non-contact-type power supply system that supplies electrical power to the battery in a non-contacting manner.

The switching elements as components of the system are shared between the step up/down circuit and the primary resonance circuit to activate either the circuit or the circuit. Thus, the size and cost of the power supply system are reduced.

The bracketed reference numerals indicate correspondence to the specific means in the embodiments described later. Other advantageous operations will be clear from preferred embodiments which are described with the accompanying drawings.

DETAILED DESCRIPTION OF THE PREFERRED EMBODIMENTS

Figure 1:
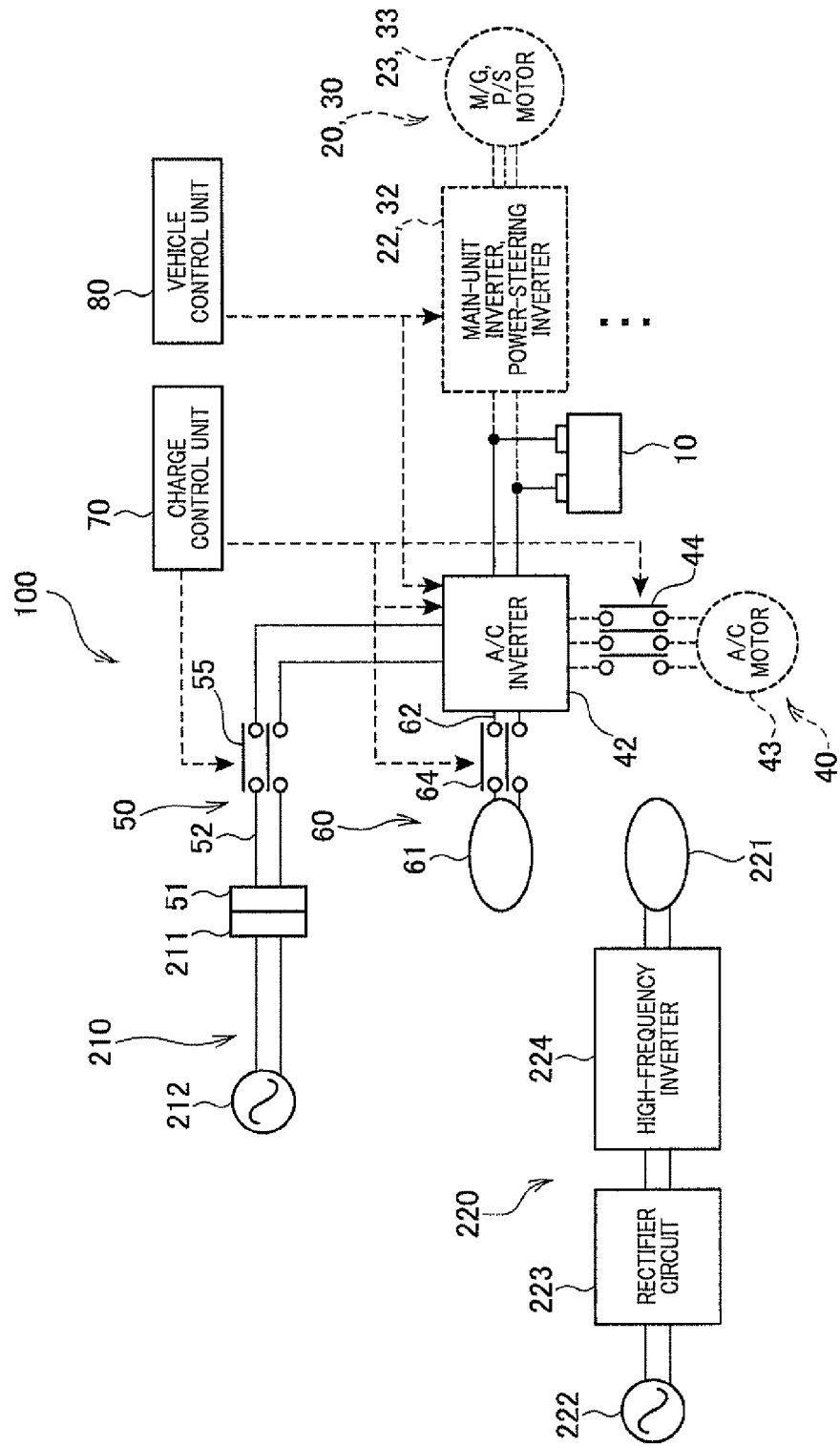
FIG. 1 is a schematic diagram illustrating a vehicle power supply system according to a first embodiment of the present invention.

With reference to the accompanying drawings, hereinafter will be described some embodiments of the present invention. It should be appreciated that, in the following embodiments and modifications, the components identical with or similar to those described in the preceding embodiment or modification are given the same reference numerals for the sake of omitting unnecessary explanation. Also, when only a part of a configuration is described in an embodiment, the remaining parts of the configuration are applied with the corresponding parts of the configuration in the preceding embodiment or modification. Further, parts of an embodiment explicitly indicated as being combinable may be combined with each other. In addition, the embodiments may be partially combined, if not explicitly expressed accordingly, unless the combinations pose any problems.

First Embodiment

Figure 2:
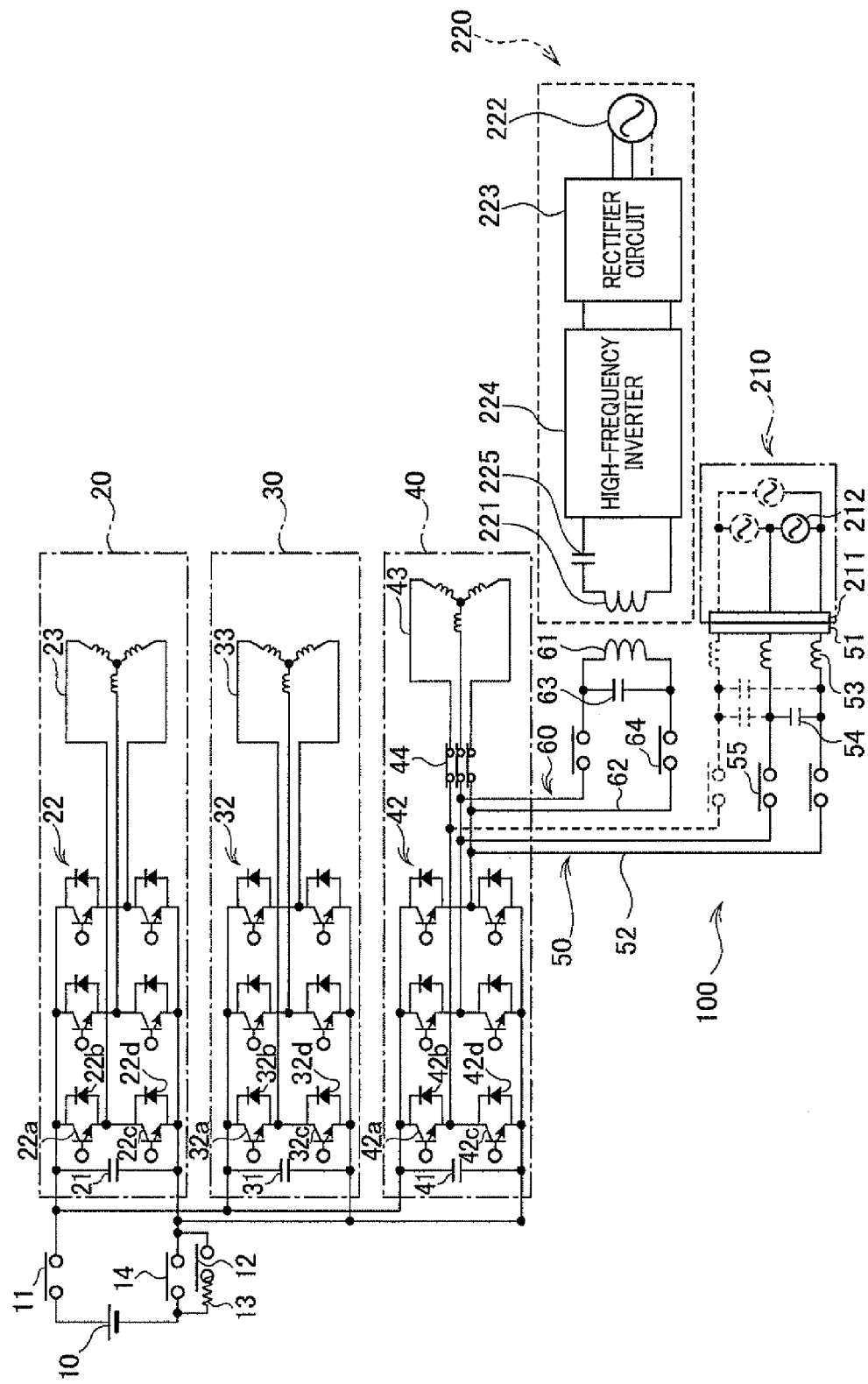
FIG. 2 is a diagram specifically illustrating the vehicle power supply system according to the first embodiment.
Figure 3:
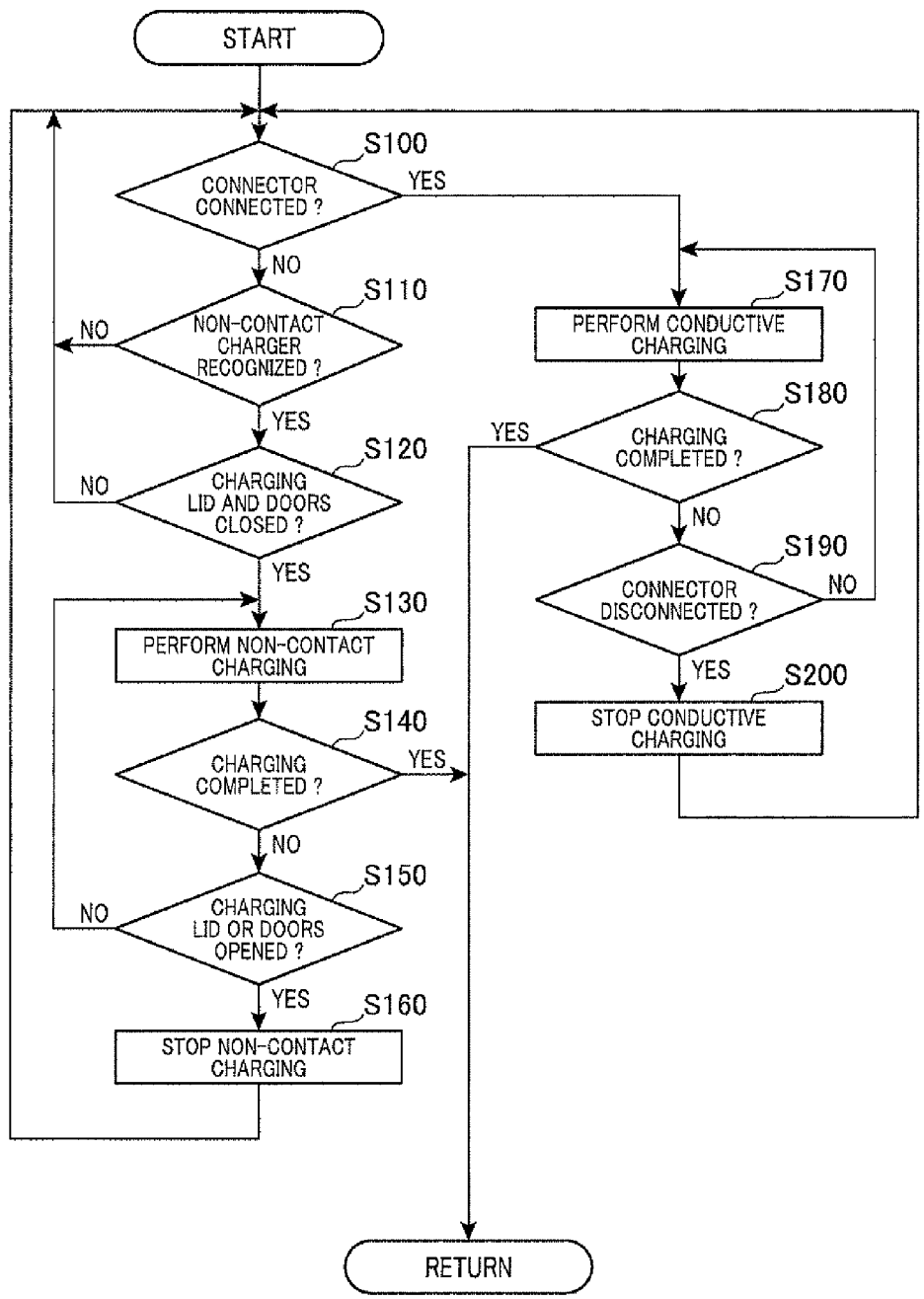
FIG. 3 is a flow diagram illustrating a process of switching between a conductive power transfer unit and a non-contact power transfer unit, which is performed by a charge control unit, according to the first embodiment.

Referring to FIGS. 1 to 3, hereinafter is described a first embodiment in which a vehicle power supply system of the present invention is applied to a hybrid vehicle.

FIG. 1 is a schematic diagram illustrating a vehicle power supply system 100 according to the first embodiment. FIG. 2 is a diagram specifically illustrating the vehicle power supply system 100. As shown in FIGS. 1 and 2, the hybrid vehicle is equipped with a high-voltage battery 10, main unit 20, electrically-driven power steering unit 30 and air-conditioning unit 40. These units 20, 30 and 40 are adapted to be driven based on the electrical power of the high-voltage battery 10. It is so configured that the operations of the units 20, 30 and 40 are controlled by a vehicle control unit 80. The power supply system 100 allows electrical power transfer between the high-voltage battery 10 and external power supply 212 or 222 (conductive charger 210 and non-contact charger 220) provided outside the vehicle. The power supply system 100 includes a conductive power transfer unit 50, a non-contact power transfer unit 60 and a charge control unit 70.

First, hereinafter are described the high-voltage unit 10, the main unit 20, the power steering unit 30 and the air-conditioning unit 40, as well as the vehicle control unit 80.

The high-voltage battery 10 is a DC battery configuring an on-vehicle high-voltage system and has a terminal voltage which is set to a high level (e.g., not less than 30 V). The high-voltage battery 10 is a secondary battery configured to enable charge/discharge. For example, a nickel metal hydride battery or a lithium ion battery is used as the high-voltage battery 10. The main unit 20, power steering unit 30 and the air-conditioning unit 40 as loads are connected to the high-voltage battery 10.

The high-voltage battery 10 has a terminal (positive pole is exemplified here) to which a load is connected via a relay 11, and another terminal (negative pole is exemplified here) to which a load is connected via a parallel connection body in which a high-resistance relay 12 and a resistor 13 are connected parallel to a low-resistance relay 14.

The main unit 20 serves as a drive source for the traveling of the vehicle and as a power generation section of the vehicle. The main unit 20 includes a capacitor 21, a main-unit inverter 22, a main-unit motor-generator 23 and the vehicle control unit 80.

The capacitor 21 serves as a power storage section that reduces variable components included in the electrical power outputted from the high-voltage battery 10 or included in the regenerative power outputted from the main-unit motor-generator 23.

The main-unit inverter 22 serves as a power conversion unit that converts the form of electrical power and regulates electrical energy, being situated between the high-voltage battery 10 and the main-unit motor-generator 23. Specifically, the main-unit inverter 22 is adapted to convert DC power of the high-voltage battery 10 into AC power (DC/AC conversion) and regulate electrical energy needed by the main-unit motor-generator 23. When the main-unit motor-generator 23 is rotated by the driving force transmitted from the drive wheels of the vehicle during deceleration, AC regenerative power is obtained. In this case, alternatively, the main-unit inverter 22 is adapted to convert the AC regenerative power into DC power (AC/DC conversion) for the supply to (charging of) the high-voltage battery 10. Thus, the main-unit inverter 22 is enabled two-way power conversion.

The main-unit inverter 22 includes three pairs of serial connection bodies each made up of a high-potential-side switching element 22a and a low-potential-side switching element 22c. The switching element 22a is connected in inverse parallel with a freewheel diode 22b, while the switching element 22c is connected in inversely parallel with a freewheel diode 22d. FIG. 2 exemplifies insulated gate bipolar transistors (IGBTs) as the switching elements 22a and 22c. The switching elements 22a and 22c are ensured to be turned on/off under the control of the vehicle control unit 80. Thus, power conversion and electrical energy regulation are enabled between the high-voltage battery 10 and the main-unit motor-generator 23.

The vehicle control unit 80 configures an on-vehicle low-voltage system insulated from the on-vehicle high-voltage system and uses, as a direct power supply, a low-voltage battery having low terminal voltage (e.g., several volts to more than ten volts). The low-voltage battery uses the high-voltage battery 10 as a power supply source. Specifically, voltage of the high-voltage battery 10 is stepped down by a DC/DC converter and the stepped-down output voltage is ensured to be applied to the low-voltage battery.

The main-unit motor-generator 23 functioning as both a motor and a generator is a three-phase AC rotary electric machine. The main-unit motor-generator 23 has a rotary shaft whose one end is directly connected with an output shaft (crank shaft) of an internal combustion engine. The rotary shaft has the other end which is mechanically connected to the drive wheels via a transmission.

The main-unit motor-generator 23, being connected to the main-unit inverter 22, is ensured to be operated and controlled by the main-unit inverter 22. In other words, upon supply of electrical energy whose power has been converted and regulated by the inverter 22, the number of revolutions and the driving torque of the motor-generator 23 are controlled to have the motor-generator 23 functioned as a motor (driving source for traveling) that gives necessary driving force to the drive wheels. Alternatively, the motor-generator 23, being rotated by the driving force from the drive wheels during deceleration, functions as a generator that generates AC regenerative power.

The electrically-driven power steering unit 30 mitigates the required manipulation force of the steering of the vehicle with the aid of the driving force of a power-steering motor 33. The power steering unit 30 includes a capacitor 31, a power-steering inverter 32, the power-steering motor 33 and the vehicle control unit 80.

The capacitor 31 serves as a power storage section that reduces variable components included in the electrical power outputted from the high-voltage battery 10.

The power-steering inverter 32 serves as a power conversion unit that converts the form of electrical power and regulates electrical energy, being situated between the high-voltage battery 10 and the power-steering motor 33. Specifically, the power-steering inverter 32 is adapted to convert DC power of the high-voltage battery 10 into AC power (DC/AC conversion) and regulate electrical energy needed by the power-steering motor 33.

Similar to the main-unit inverter 22, the power-steering inverter 32 includes three pairs of serial connection bodies each made up of a high-potential-side switching element 32a and a low-potential-side switching element 32c. The switching element 32a is connected in inverse parallel with a freewheel diode 32b, while the switching element 32c is connected in inversely parallel with a freewheel diode 32d. FIG. 2 exemplifies insulated gate bipolar transistors (IGBTs) as the switching elements 32a and 32c. The switching elements 32a and 32c are ensured to be turned on/off under the control of the vehicle control unit 80. Thus, power conversion and electrical energy regulation are enabled between the high-voltage battery 10 and the power-steering motor 33.

The motor 33 is a three-phase AC motor. The motor 33 has a rotary shaft which is connected to a main shaft of a steering gear via a gear mechanism or the like. Being connected to the inverter 32, the motor 33 is ensured to be operated and controlled by the inverter 32. In other words, upon supply of electrical energy whose power has been converted and regulated by the inverter 32, the number of revolutions and the driving torque of the motor 33 are controlled to add necessary driving force to the main shaft of the steering gear (to assist the steering gear).

The air-conditioning unit 40 uses the driving force of an air-conditioning motor 43 to drive a compressor in a freezing cycle. The air-conditioning unit 40 also regulates the temperature of conditioned air, using an evaporator in the freezing cycle and a heater core that uses cooling water of the engine as a heating source. The air-conditioning unit 40 includes a capacitor 41, an air-conditioning inverter 42, the air-conditioning motor 43 and the vehicle control unit 80.

The capacitor 41 serves as a power storage section that reduces variable components included in the electrical power outputted from the high-voltage battery 10.

The air-conditioning inverter 42 serves as a power conversion unit of a motor, which converts the form of electrical power and regulates electrical energy, being situated between the high-voltage battery 10 and the air-conditioning motor 43. Specifically, the air-conditioning inverter 42 is adapted to convert DC power of the high-voltage battery 10 into AC power (DC/AC conversion) and regulate electrical energy needed by the air-conditioning motor 43. Alternatively, as will be described later, the air-conditioning inverter 42 is adapted to convert commercial AC power from the external power supply 210 or 220 into DC power (AC/DC conversion) for the supply to (the charging of) the high-voltage battery 10. Thus, the air-conditioning inverter 42 is enabled two-way power conversion.

Similar to the main-unit inverter 22, the air-conditioning inverter 42 includes three pairs of serial connection bodies each made up of a high-potential-side switching element 42a and a low-potential-side switching element 42c. The switching element 42a is connected in inversely parallel with a freewheel diode 42b, while the switching element 42c is connected in inversely parallel with a freewheel diode 42d. FIG. 2 exemplifies insulated gate bipolar transistors (IGBTs) as the switching elements 42a and 42c. The switching elements 42a and 42c are ensured to be turned on/off under the control of the vehicle control unit 80. Thus, power conversion and electrical energy regulation are enabled between the high-voltage battery 10 and the air-conditioning motor 43.

The motor 43 is a three-phase AC motor. The motor 43 has a rotary shaft which is connected to a main shaft of a compressor. The motor 43, being connected to the inverter 42, is ensured to be operated and controlled by the inverter 42. In other words, upon supply of electrical energy whose power has been converted and regulated by the inverter 42, the number of revolutions and the driving torque of the motor 43 are controlled to add necessary driving force to the main shaft of the compressor.

The motor 43 has terminals corresponding to coils of U-, V- and W-phases, which are connected to respective output terminals of the inverter 42 through electrical lines. Each of the electrical lines is provided with a relay 44. The relay 44 serves as an opening/closing means for the respective electrical line. When electrical power is transferred between the external power supply 212 or 222, and the high-voltage battery 10 via the inverter 42, the relays 44 each prevents the electrical power from flowing into the motor 43. The relays 44 are ensured to be turned on/off under the control of the charge control unit 70.

Hereinafter are described the conductive power transfer unit 50, the non-contact power transfer unit 60 and the charge control unit 70 in the vehicle power supply system 100.

The conductive power transfer unit 50 serves as a conductive power transfer means that transfers electrical power between the high-voltage battery 10 and the conductive charger 210 (external power supply 212) being electrically connected therebetween. The "power transfer" here refers to charging from the external power supply 212 to the high-voltage battery 10, or discharging from the high-voltage battery 10 to the external power supply 212.

The conductive power transfer unit 50 uses the air-conditioning inverter 42, for example, as a common power conversion unit from among the inverters 22, 32 and 42. The conductive power transfer unit 50 includes the air-conditioning inverter 42, a vehicle-side connector 51, power transfer paths 52, reactors 53, capacitors 54 and relays 55.

The connector 51 serves as a vehicle-side connection part that establishes direct electrical connection with the conductive charger 210 (charger-side connector 211). The connector 51 is formed according to the type of the external power supply 212 so as to be suitable for a single-phase commercial AC power supply (100 V) or a three-phase commercial AC power supply (200 V).

Meanwhile, an opening is formed in the vehicle's front body surface (e.g., at a frontward center position of the bonnet) or the vehicle's rear lateral surface (e.g., at a position in a lateral side of the vehicle, which is opposite to the side where the fuel filler is provided). The connector 51 is accommodated in a given space that is the interior of the opening. The opening is provided with a charging lid that closes/opens the opening. The user can access the connector 51 from outside the vehicle when the charging lid is opened.

The connector 51 is connected with one end of each of two or three power transfer paths 52. The other end of each of the power transfer paths 52 is connected between the corresponding output terminal of the air-conditioning inverter 42 and a terminal of the corresponding coil of the air-conditioning motor 43. Each power transfer path 52 is provided with the reactor 53, the capacitor 54 and the relay 55 from the side of the connector 51 toward the inverter 42.

The reactors 53, i.e. windings, are used to store energy for electric charging. The capacitors 53 serve as storage parts that reduce variable components included in charged electrical power. The relays 55 serve as opening/closing means that open/close the respective power transfer paths 52. When the motor 43 is under the control of the inverter 42, the relays 55 prevent electrical connection between the inverter 42 and the external power supply 212. The opening/closing operation of the relays 55 is controlled by the charge control unit 70.

The conductive charger 210 is made available by extending the charger-side connector 211 from a residential power supply or a power supply at a charging station, which serves as the external power supply 212 for the vehicle. A single-phase commercial AC power supply (e.g. 100 V) or a three-phase commercial AC power supply (e.g. 200 V) at a residential house or at a charging station is available as the external power supply 212. The charger-side connector 211 can be connected to and disconnected from the vehicle-side connector 51. The external power supply 212 corresponds to the power supply section of the present invention.

The non-contact power transfer unit 60 serves as a non-contact power transfer means that transfers power in a state of being electromagnetically connected between the high-voltage battery 10 and the non-contact charger 220 (external power supply 222). In other words, the non-contact power transfer unit 60 transfers electrical power using electromagnetic induction or magnetic resonance. The "power transfer" here refers to charging from the external power supply 222 to the high-voltage battery 10 or discharging from the high-voltage battery 10 to the external power supply 222.

Similar to the conductive power transfer unit 50, the non-contact power transfer unit 60 uses the air-conditioning inverter 42, for example, as a common power conversion unit from among the inverters 22, 32 and 42. The non-contact power transfer unit 60 includes the air-conditioning inverter 42, a coil 61, power transfer paths 62, a capacitor 63 and relays 64.

The coil 61 forms a transformer (secondary-side transformer) together with a pad 221 of the non-contact charger 220 and establishes magnetic connection with the non-contact charger 220 (pad 221). The coil 61 is connected with one end of each of the two power transfer paths 62. The other end of each of the two power transfer paths 62 is connected between one of the three output terminals of the inverter 42 and a terminal of the corresponding coil of the motor 43. Each power transfer path 62 is provided with the capacitor 63 and the relay 64 from the side of the coil 61 toward the inverter 42.

The capacitor 63 serves as a compensation component of an inductance of the coil 61. The relays 64 serve as opening/closing means that open/close the respective power transfer paths 62. When the motor 43 is under the control of the inverter 42, the relays 64 prevent electrical connection between the inverter 42 and the external power supply 222. The opening/closing operation of the relays 64 is controlled by the charge control unit 70.

The non-contact charger 220 is made available, for example, by electrically connecting the pad 221, in a non-contact manner, with the coil 61 from a power supply of a charging station that is the external power supply 222 for the vehicle, via a rectifier circuit 223, a high-frequency inverter 224 and a capacitor 225. The external power supply 222 corresponds to the power supply section of the present invention.

The pad 221 forms a transformer (primary-side transformer) together with the coil 61 of the non-contact power supply unit 60. When current is passed from the external power supply 222 to the pad 221 via the rectifier circuit 223, the high-frequency inverter 224 and the capacitor 225, an electromotive force (self-induction electromotive force) is caused in the pad 221. Further, an electromotive force (mutual-induction electromotive force) is also caused in the port 61 that forms the secondary side of the transformer.

When the high-voltage battery 10 is charged (or discharged) by the conductive power transfer unit 50 and the conductive charger 210, the charge control unit 70 controls the operation of the conductive power transfer unit 50. Similarly, when the high-voltage battery 10 is charged (or discharged) by the non-contact power transfer unit 60 and the non-contact charger 220, the charge control unit 70 controls the operation of the non-contact power transfer unit 60.

When the high-voltage battery 10 is charged (discharged), the charge control unit 70 opens/closes the relays 44, 55 and 64 and opens/closes (turns on/off) the switching elements 42$a$ and 42$c$ of the air-conditioning inverter 42. Further, the charge control unit 70 has functions of detecting the opening/closing state of the charging lid, the opening/closing state of the vehicle doors, the connecting state between the vehicle-side connector 51 and the charger-side connector 211, and presence/absence of the non-contact charger 220 when the vehicle has accessed the non-contact charger 220.

Hereinafter, the operation of the present embodiment is described.

When the vehicle is in operation, the inverters 22, 32 and 42 are controlled by the vehicle control unit 80. Accompanying this, the main-unit motor-generator 23, the power-steering motor 33 and the air-conditioning motor 43 are controlled so that necessary number of revolutions and driving torque are obtained. Then, the units 20, 30 and 40 are controlled.

Use of the main-unit motor-generator 23, the power-steering motor 33 and the air-conditioning motor 43 will reduce the amount of electrical power stored in the high-voltage battery 10. Accordingly, the battery is needed to be charged by the user. The vehicle power supply system 100 of the present embodiment includes the conductive power transfer unit 50 and the non-contact power transfer unit 60. Depending on the following various conditions, the charge control unit 70 automatically selects either the power transfer unit 50 or 60 and controls charging. Referring to the flow diagram of FIG. 3, hereinafter is specifically described the selection and the control performed by the charge control unit 70.

First, at step S100 of FIG. 3, the charge control unit 70 determines whether or not connection is established between the vehicle-side connector 51 and the charger-side connector 211. Upon detection of connection between the connectors 51 and 211, the charge control unit 70 recognizes that the user has a request for charging electrical energy using the conductive charger 210 at, for example, the user's home or a charging station. Hereinafter, the charging using the conductive charger 210 is referred to as "contact charging".

If a negative determination is made at step S100, or if it is determined that the charger-side connector 211 is not connected to the vehicle-side connector 51, control proceeds to step S110.

At step S110, the charge control unit 70 determines whether or not the non-contact charger 220 has been recognized such as by wireless communication. This corresponds, for example, to the case where the user drives the vehicle into a charging station for the charging with electrical energy and stops the vehicle at a predetermined charging position, and the charge control unit 70 recognizes the presence of the non-contact charger 220 provided at the charging station in the vicinity of the vehicle. Alternatively, if the user does not stop the vehicle at a charging station, this corresponds to the case where the charge control unit 70 determines the absence of the non-contact charger 220 in the vicinity of the vehicle.

Recognizing the presence of the non-contact charger 220, the charge control unit 70 recognizes that the user has a request for charging electrical power using the non-contact charger 220. Hereinafter, the charging using the non-contact charger 220 is referred to as "non-contact charging". If a negative determination is made by the charge control unit 70 at step S110, control returns to step S100.

If an affirmative determination is made at step S110, control proceeds to step S120. At step S120, the charge control unit 70 determines whether or not the charging lid and the vehicle doors are closed. Detecting that the charging lid is closed, the charge control unit 70 recognizes that the user will not charge electrical power using the conductive charger 210. Also, detecting that the vehicle doors are closed, the charge control unit 70 recognizes that the user does not have any work to do outside the vehicle. If a negative determination is made at step S120 by the charge control unit 70, control returns to step S100.

If an affirmative determination is made at step S120, there is no possibility of performing contact charging. Accordingly, control proceeds to step S130 where the charge control unit 70 carries out non-contact charging using the non-contact charger 220. In this case, the charge control unit 70 activates the non-contact power transfer unit 60. Specifically, the charge control unit 70 opens the relays 44 and 55 and closes the relays 64. Then, the charge control unit 70 allows is electromotive force to be induced in the pad 221 and the port 61, and changes over each of the switching elements 42a and 42c of the air-conditioning inverter 42. Thus, the AC power from the external power supply 222 is converted into DC power to charge the high-voltage battery 10.

Then, at step S140, it is determined whether or not the non-contact charging has been completed. At this step, the charge control unit 70 determines the completion of the charging when the high-voltage battery 10 has been fully charged, or when the amount of charge has reached a level set by the charging system or by the user. If the charging is determined as being completed at step S140, the charge control unit 70 ends the charge control. If the charge control unit 70 determines that the charging has not been completed, control proceeds to step S150.

At step S150, the charge control unit 70 determines during the process performed at step S130 whether or not the charging lid or the vehicle doors have been opened. Detecting the opening of the charging lid, the charge control unit 70 recognizes that the user now has a request for charging electrical power using the conductive charger 210. Alternatively, detecting the opening of the vehicle doors, the charge control unit 70 recognizes that the user has some work to do outside the vehicle. The opening of the charging lid or the opening of the vehicle doors corresponds to "preparing for power transfer by the conductive power transfer unit 50" in the present invention.

Accordingly, if an affirmative determination is made at step S150, control proceeds to step S160 where the charge control unit 70 stops the non-contact charging started at step S130 using the non-contact charger 220. In stopping the non-contact charging, the charge control unit 70 stops the activation of the non-contact power transfer unit 60. Specifically, the charge control unit 70 opens the relays 64 and stops changeover of the switching elements 42a and 42c of the air-conditioning inverter 42. Then, control of the charge control unit 70 returns to step S100. If a negative determination is made at step S150, the charge control unit 70 continues the non-contact charging at step S130.

On the other hand, at step S100, if an affirmative determination is made, or if it is determined that the charger-side connector 211 has been connected to the vehicle-side connector 51, control proceeds to step S170. At step S170, the charge control unit 70 carries out contact charging using the conductive charger 210. In this case, the charge control unit 70 activates the conductive power transfer unit 50.

Specifically, the charge control unit 70 opens the relays 44 and 64, closes the relays 55, and changes over the switching elements 42a and 42c of the air-conditioning inverter. Thus, the AC power of the external power supply 212 is converted into DC power to charge the high-voltage battery 10.

Then, at step S180, it is determined whether or not the contact charging has been completed. The conditions for determining completion of contact charging are similar to those of step S140. Determining completion of the contact charging at step S180, the charge control unit 70 ends the charge control. If the contact charging is determined as not being completed, control proceeds to step S190.

At step S190, the charge control unit 70 determines during the process at step S170 whether or not the charger-side connector 211 has been disconnected from the vehicle-side connector 51. Detecting that the charger-side connector 211 has been disconnected from the vehicle-side connector 51, the charge control unit 70 recognizes that the user has finished the contact charging using the conductive charger 210. Disconnecting the charger-side connector 211 from the vehicle-side connector 51 corresponds to "releasing electrical connection between the high-voltage battery 10 and the external power supply 212 by the conductive power transfer unit 50" in the present invention.

Accordingly, if an affirmative determination is made at step S190, control proceeds to step S200 where the charge control unit 70 stops the contact charging. In stopping the contact charging, the charge control unit 70 stops the activation of the conductive power transfer unit 50. Specifically, the charge control unit 70 opens the relays 55 and stops changeover of the switching elements 42a and 42c of the air-conditioning inverter 42. If a negative determination is made at step S190, the charge control unit 70 continues the contact charging at step S170.

When the contact charging is stopped, at step S200, by the charge control unit 70, control again returns to step S100. Then, the charge control unit 70 make a recognition as to the establishment of connection between the connectors 51 and 211 (step S100), as to the presence of the non-contact charger 220 (step S110), and as to the closed state of the vehicle doors. Then, if the conditions of the non-contact charging are met, control proceeds to step S130 to carry out the non-contact charging.

As described above, the vehicle power supply system 100 has two units, i.e. the conductive power transfer unit 50 and the non-contact power transfer unit 60. In the vehicle power supply system 100, the power conversion unit of the conductive power transfer unit 50 and the power conversion unit of the non-contact power transfer unit 60 are provided in the form of a single common power conversion unit 42. Thus, the power conversion unit is simplified to enhance the installability of the vehicle power supply system 100 to a vehicle and reduce the weight and the cost of the system.

The common power conversion unit 42 is enabled two-way power conversion using the switching elements 42a and 42c and the freewheel diodes 42b and 42d. Therefore, in addition to the charging to the high-voltage battery 10 as described in the above embodiment, the common power conversion unit 42 enables discharging from the high-voltage battery 10 to the external power supply 212 or 222 at a residential house or a charging station when electrical energy is needed at the residential house or the charging station.

The common power conversion unit 42 is ensured to be shared with any of the inverters (power conversion units) 22, 32 and 42 provided at the units 20, 30 and 40, respectively, installed in the vehicle. Thus, the power conversion unit is further simplified and thus the installability of the vehicle power supply system 100 to the vehicle is enhanced and weight and cost of the system are reduced.

As described referring to FIG. 3, in the vehicle power supply system 100 having two units of conductive power transfer, i.e., the unit 50 and the non-contact power transfer unit 60, the charge control unit 70 selects and activates either the unit 50 or 60 depending on various conditions. Thus, the user is not required to set a charging process to be requested such as via a selection switch every time a need arises, and erroneous operation can be avoided. Thus, the vehicle power supply system 100 has good usability.

Second Embodiment

Figure 4:
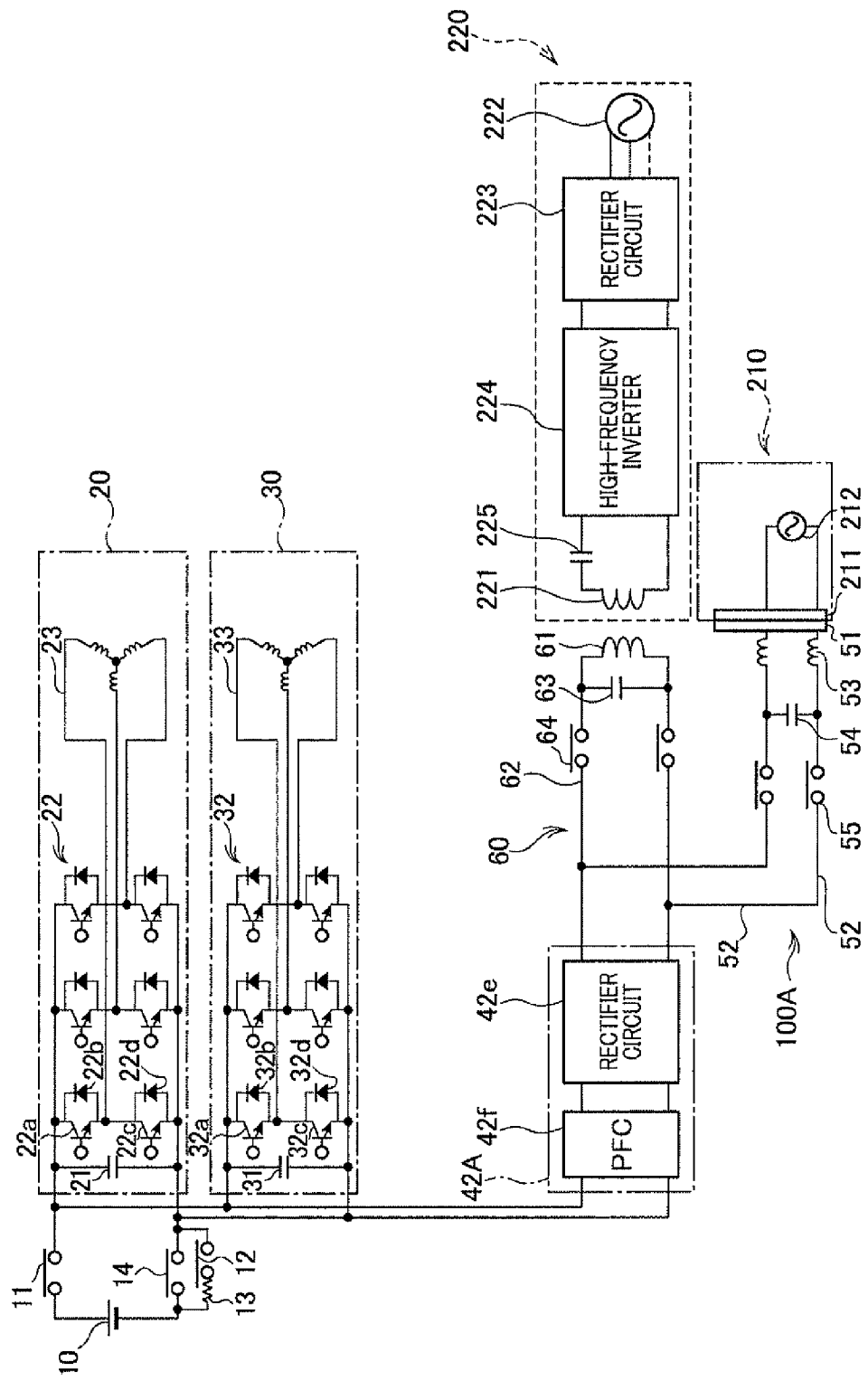
FIG. 4 is a diagram specifically illustrating a vehicle power supply system according to a second embodiment of the present invention.

Referring to FIG. 4, hereinafter is described a vehicle power supply system 100A according to a second embodiment of the present invention. FIG. 4 is a diagram specifically illustrating the vehicle power supply system 100A according to the second embodiment. The second embodiment is different from the first embodiment in that the common power conversion unit (air-conditioning inverter) 42 in the conductive power transfer unit 50 and the non-contact power transfer unit 60 has been replaced by a common power conversion unit 42A.

The common power conversion unit 42A includes a rectifier circuit 42e and a power factor correction circuit 42f. The rectifier circuit 42e includes a rectifying diode and is ensured to convert AC power from the external power supply 212 or 222 into DC power (AC/DC conversion). The rectifier circuit 42e is not provided with the switching elements 42a and 42c as provided in the air-conditioning inverter 42 of the first embodiment. Accordingly, the rectifier circuit 42e enables one-way power conversion used in the electrical power charging from the external power supply 212 or 222 to the high-voltage battery 10.

The common power conversion unit 42A is configured to be controlled by the charge control unit 70. The power factor correction circuit 42f improves the power factor that indicates the ratio of effective power to apparent power, or approximates the power factor to "1" as much as possible.

In the second embodiment, charge control (see the flow diagram of FIG. 3) similar to the first embodiment may be performed to provide similar advantages. However, since the common power conversion unit 42A enables only one-way power conversion, electrical power cannot be discharged from the high-voltage battery 10 to the external power supply 212 or 222, unlike the first embodiment.

Third Embodiment

Figure 5:
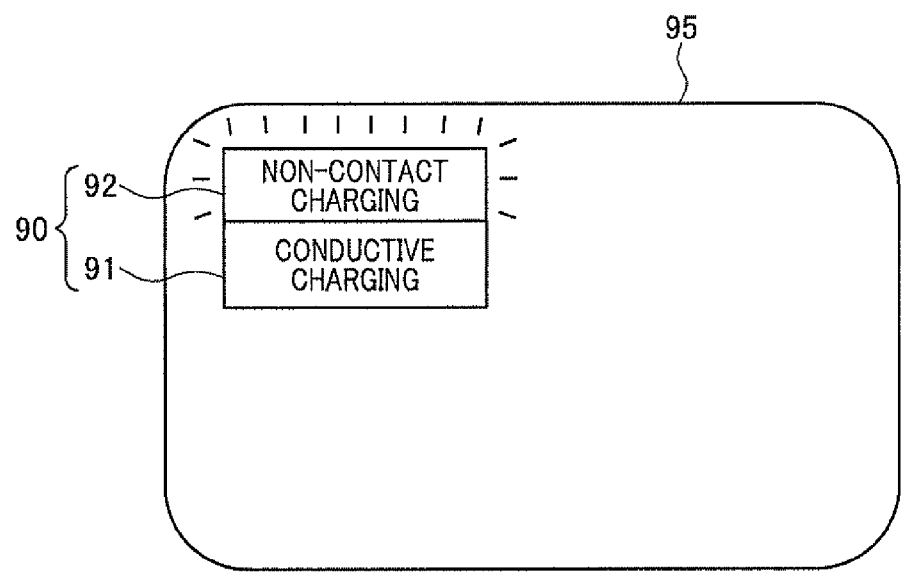
FIG. 5 is a front view illustrating a display according to a third embodiment of the present invention.

Referring to FIG. 5, a third embodiment of the present invention is described. FIG. 5 is a front view illustrating a display according to the third embodiment. The third embodiment is different from the first and second embodiments in that a display 90 is provided to indicate to the user which of contact charging and non-contact charging is being carried out.

The display 90 includes a conductive charging display part 91 and a non-contact charging display part 92. The conductive charging display part 91 indicates that conductive charging (or contact charging, wired charging) is being carried out with the activation of the conductive power transfer unit 50. The non-contact charging display part 92 indicates that non-contact charging (or wireless charging) is being carried out with the activation of the non-contact power transfer unit 60.

For example, the display parts 91 and 92 are arranged in a predetermined area of a vehicle dashboard 95 that indicates the vehicle speed and the engine speed, or of a monitor image that indicates the operating conditions of the vehicle. The conductive charging display part 91 is formed, for example, as a lamp with an indication "conductive is charging". The conductive charging display part 91 is lit by the charge control unit 70 when contact charging is being carried out. Otherwise, the conductive charging display part 91 is lit out. The non-contact charging display part 92 is formed, for example, as a lamp with an indication "non-contact charging". The non-contact charging display part 92 is lit by the charge control unit 70 when non-contact charging is underway. Otherwise, the non-contact charging display part 92 is unlit As described above, the user is able to easily recognize, at the time of charging, which of the charging processes (contact charging or non-contact charging) is used for the charging. For example, the user may carry out contact charging and, after completion of the contact charting, may start the vehicle forgetting to disconnect the charger-side connector 211 from the vehicle-side connector 51 (or leaving the connectors in the state of being connected). In this regard, use of the display 90 may prevent the occurrence of such a situation.

Fourth Embodiment

Figure 6:
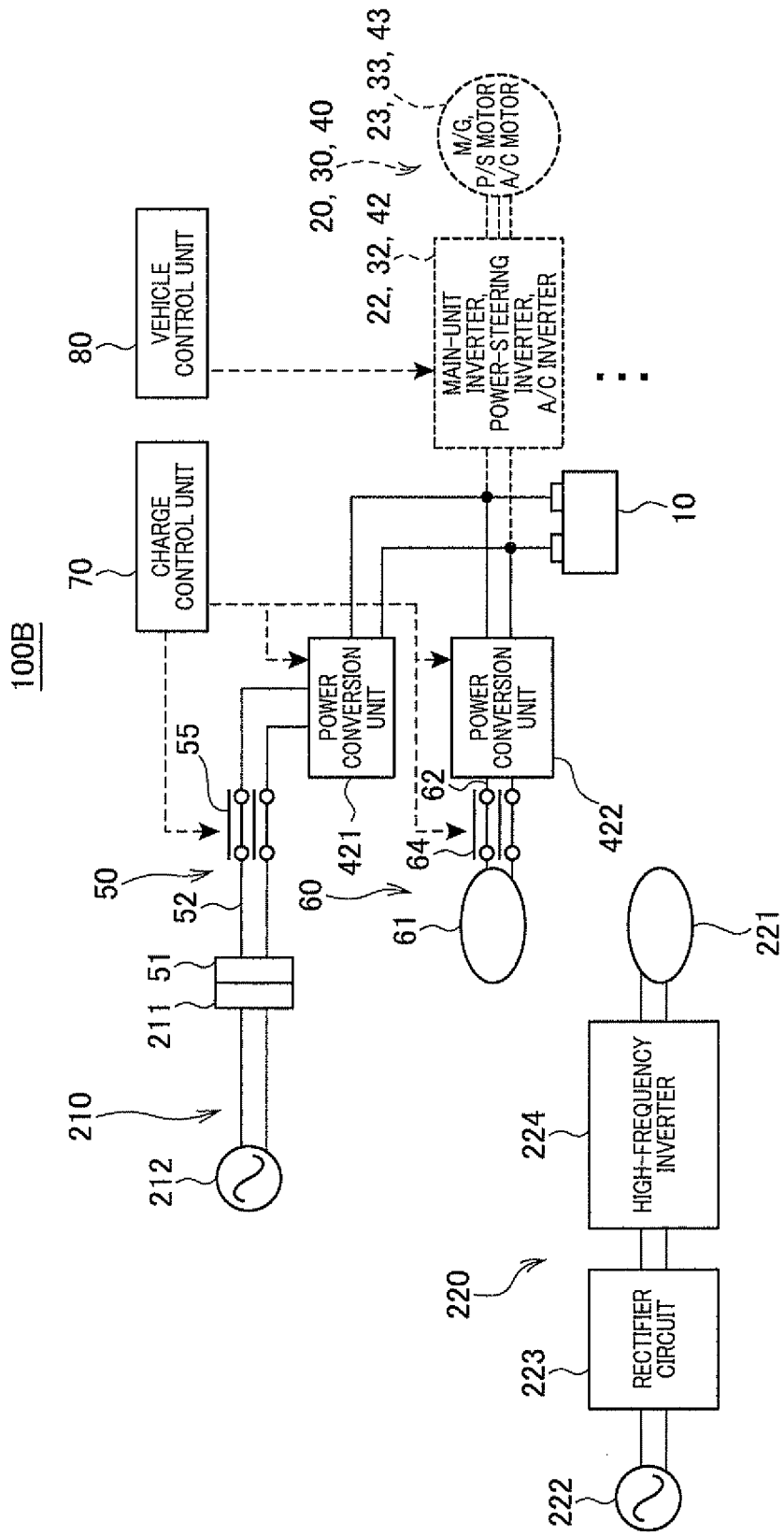
FIG. 6 is a schematic diagram illustrating a vehicle power supply system according to a fourth embodiment of the present invention.
Figure 7:
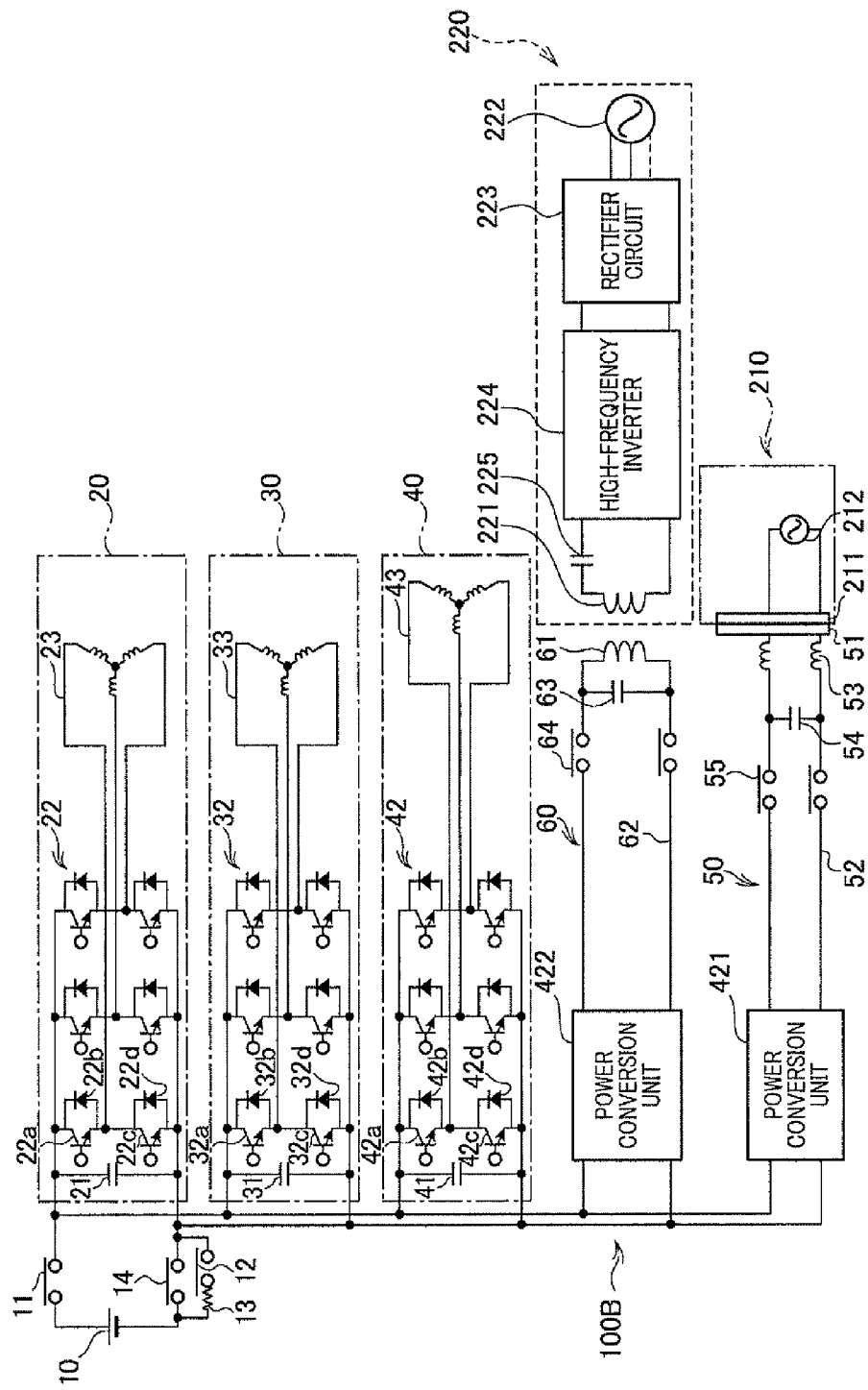
FIG. 7 is a diagram specifically illustrating the vehicle power supply system according to the fourth embodiment.

Referring to FIGS. 6 and 7, hereinafter is described a vehicle power supply system 100B according to a fourth embodiment of the present invention. FIG. 6 is a schematic diagram illustrating the power supply system 100B according to the fourth embodiment. FIG. 7 is a diagram specifically illustrating the vehicle power supply system 100B. The fourth embodiment is different from the first to third embodiments in that the fourth embodiment includes a power conversion unit 421 used for the conductive power transfer unit 50 and a power conversion unit 422 used for the non-contact power transfer unit 60. The power conversion units 421 and 422 correspond to the air-conditioning inverter 42 or the common power conversion unit 42A of the first to third embodiments.

The power conversion units 421 and 422 are provided being independent of the inverters 22, 32 and 42 of the units 20, 30 and 40, respectively. For example, each of the power conversion units 421 and 422 may include the switching elements and the freewheel diodes as in the air-conditioning inverter 42 to enable two-way power conversion, or may include the rectifying diode as in the common power conversion unit 42A to enable only on-way power conversion.

The power conversion unit 421 is arranged at the power transfer path 52 of the conductive power transfer unit 50 and adapted to convert AC power from the external power supply 212 into DC power (AC/DC conversion). The power conversion unit 422 is arranged at the power transfer path 62 of the non-contact power transfer unit 60 and adapted to convert AC power from the external power supply 222 into DC power (AC/DC conversion). It is so configured that the power conversion units 421 and 422 are controlled by the charge control unit 70. In the present embodiment, the relays 44 of the air-conditioning unit 40 are removed.

The operation (charge control) of the vehicle power supply system 100B at the time of charging is basically similar to that of the first embodiment (see the flow diagram of FIG. 3), and thus provides the similar advantages. Specifically, as described referring to FIG. 3, in the vehicle power supply system 100B having two units of conductive power transfer unit 50 and the non-contact power transfer unit 60, the charge control unit 70 is ensured to select and activate either the unit 50 or 60 depending on various conditions. Thus, the user is not required to select a specific charging process every time a need arises, and thus erroneous operation can be avoided. Thus, the vehicle power supply system 100B also has good usability.

[Modifications]

In the first embodiment described above, the air-conditioning inverter 42 is used as a common power conversion unit for the conductive power transfer unit 50 and the non-contact power transfer unit 60. Alternative to this, however, a common conversion part may be provided separately from the inverters 22, 32 and 42 of the units 20, and 40, respectively.

In the fourth embodiment described above, the power conversion unit 421 for the conductive power transfer unit 50 and the power conversion unit 422 for the non-contact power transfer unit 60 are provided separately from the inverters 22, 32 and 42 of the units 20, 30 and 40, respectively. Alternative to this, however, the power conversion unit 421 for the conductive power transfer unit 50 and the power conversion unit 422 for the non-contact power transfer unit 60 may be shared between the inverters 22, 32 and 42 of the units 20, 30 and 40, respectively.

The embodiments described above use the port 61 and the pad 221 in exemplifying the inductive process described in the patent document JP-A-2008-220130. However, this inductive process using the port 61 and the pad 221 may be replaced by a resonant process using a plurality of inductive coils or a plurality of antennas causing serial or parallel resonance, as is known as a technique of using non-contact power.

Fifth Embodiment

Figure 8:
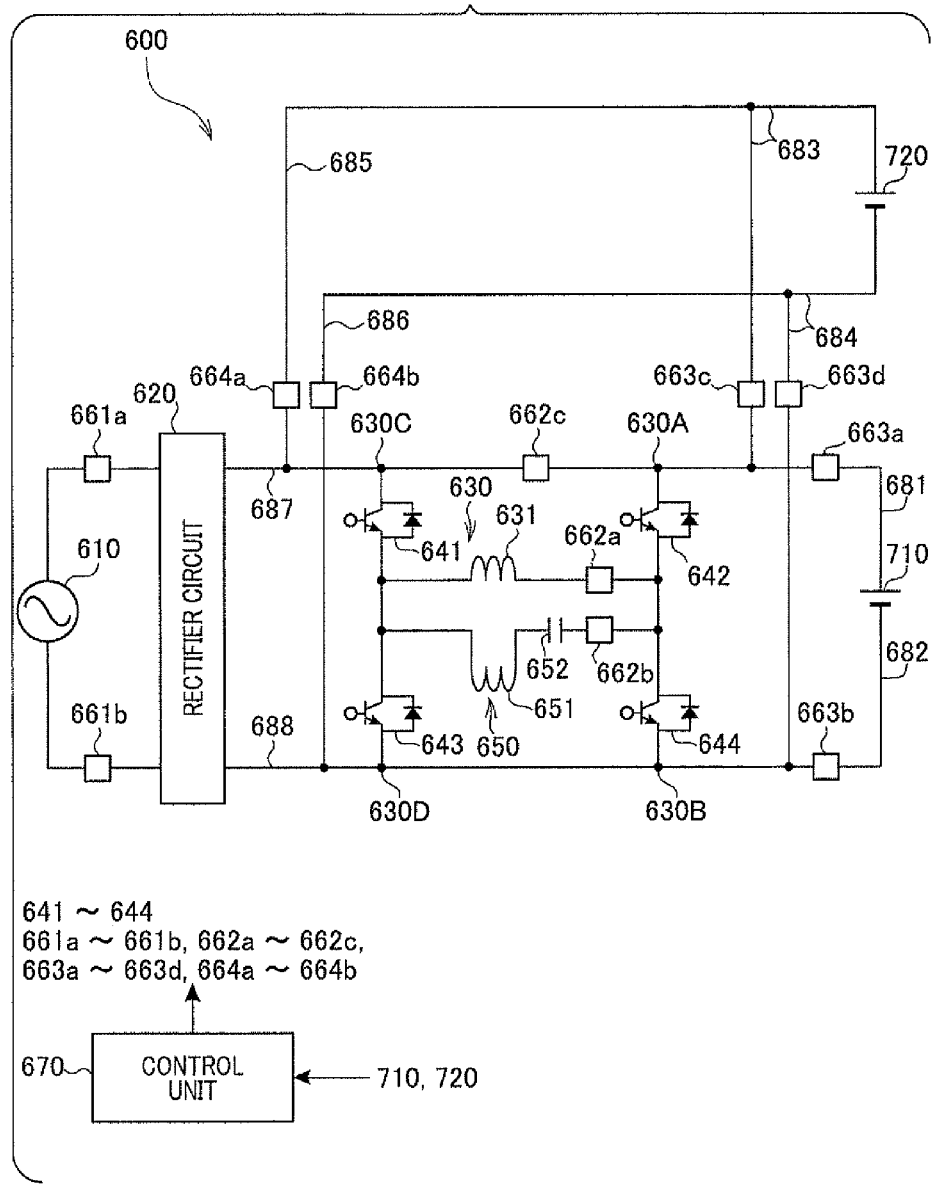
FIG. 8 is a circuit diagram illustrating a power supply system according to a fifth embodiment of the present invention.

Referring to FIG. 8 (as well as FIG. 12 or 13) hereinafter is described a power supply system 600 according to an embodiment of the present invention. FIG. 8 is a circuit diagram illustrating the power supply system 600.

Figure 12:
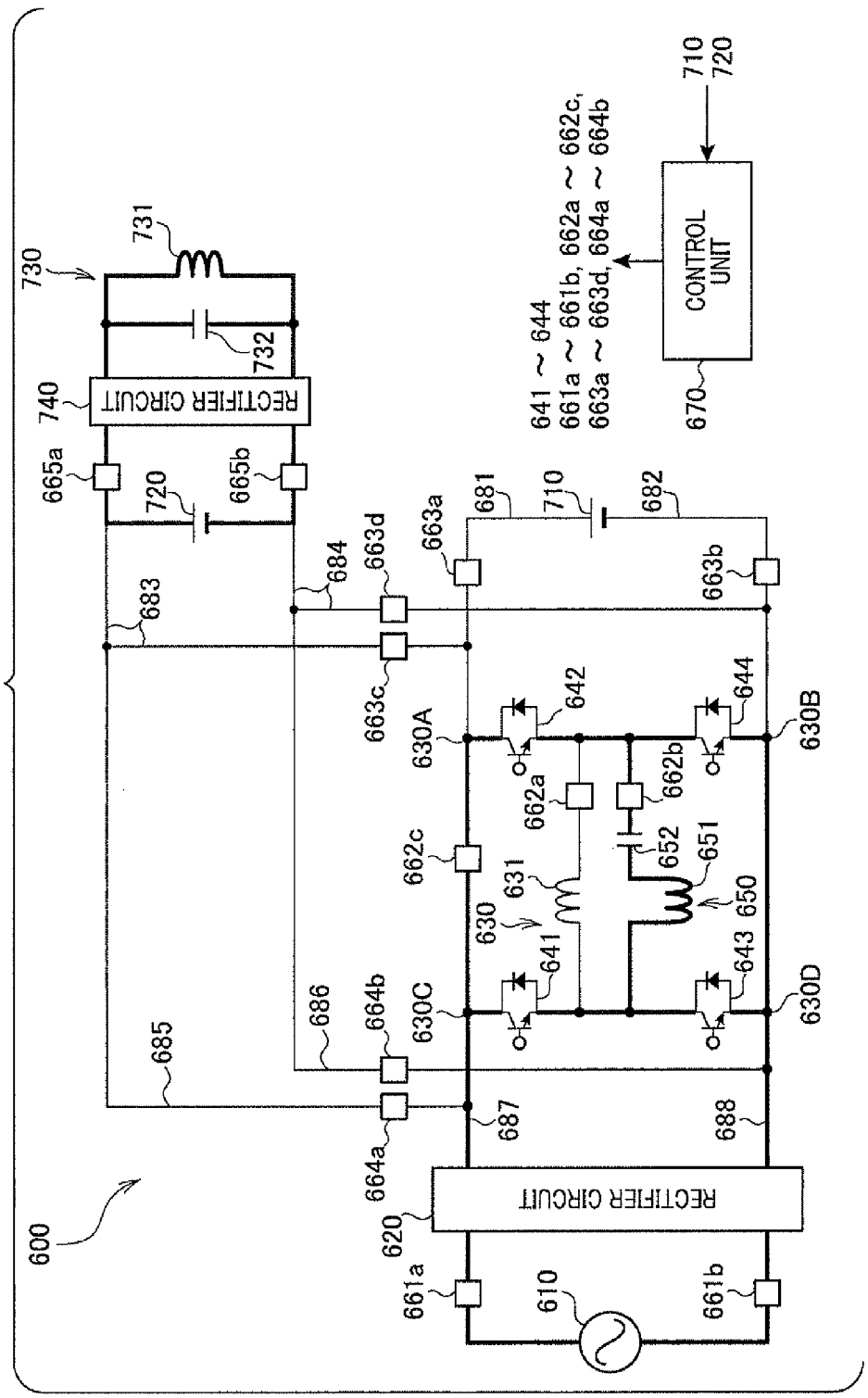
FIG. 12 is a circuit diagram illustrating a state of non-contact power supply from an AC power supply.
Figure 13:
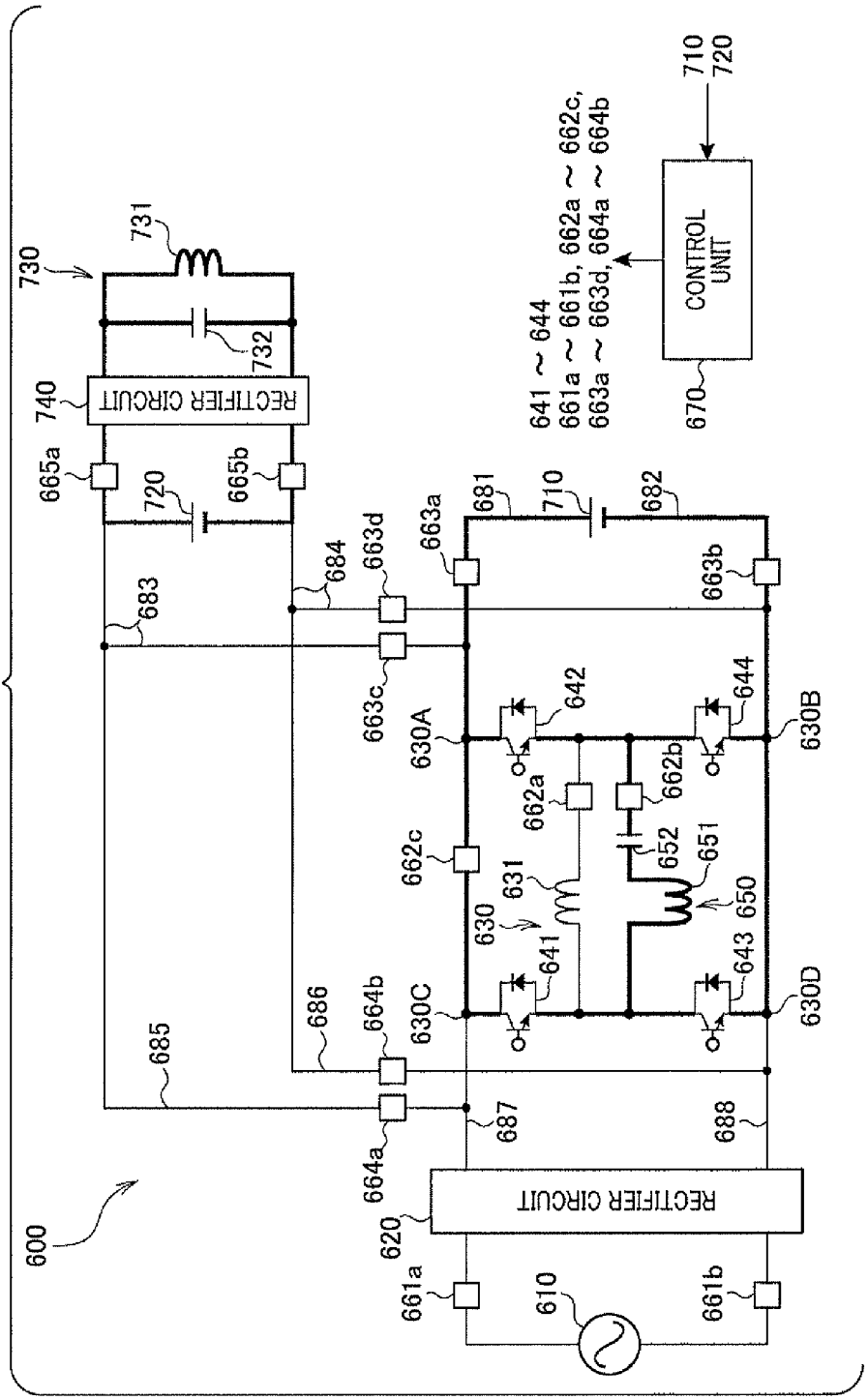
FIG. 13 is a circuit diagram illustrating a state of non-contact power supply from a residential battery.

As shown in FIG. 8, the power supply system 600 is installed such as in a residential house to supply (charge) electrical power to a residential battery 710 or a vehicle battery 720 in a contact manner. Alternatively, as shown in FIG. 12 or 13, the power supply system 600 supplies (charges) electrical power to a battery (vehicle battery 720 here) connected to a secondary resonance circuit 730 of a non-contact charger. Further, the power supply system 600 is able to supply electrical power between the residential battery 710 and the vehicle battery 720.

The residential battery 710 is installed in a residential house to supply electrical power to various household electrical appliances, such as an air conditioner, television set, refrigerator, lighting fixtures, electric water heater, and the like. The vehicle battery 720 is installed such as in a hybrid car or an electric car to supply electrical power to the drive motor that serves as a drive unit. The residential battery 710 corresponds to one battery, while the vehicle battery 720 corresponds to a second battery or a battery that charges electrical power via a secondary resonance circuit.

The power supply system 600 includes an AC power supply 610, rectifier circuit 620, step up/down circuit 630, switching elements 641 to 644, primary resonance circuit 650, relays 661a, 661b, 662a to 662c, 663a to 663d, 664a and 664b, and control unit 670.

The AC power supply 610 supplies commercial AC power (e.g. three-phase AC power) to the rectifier circuit 620. The rectifier circuit 620 rectifies AC power into DC power. The relays 661a and 661b are provided between the AC power supply 610 and the rectifier circuit 620. When the relays 661a and 661b are turned on/off, the AC power supply 610 and the rectifier circuit 620 are connected or disconnected. Also, the relays 661a and 661b are turned on/off under the control of the control unit 670.

The step up/down circuit 630 regulates the voltage of the electrical power rectified by the rectifier circuit 620 so as to be suitable for the voltage required by the battery 710 or 720. The step up/down circuit 630 has a shape of an "H" to constitute a circuit in which the low-potential side is allowed to be electrically continuous using a power line, with a reactor 631 being provided at the center of the shape of an "H". The reactor 631 is a winding that stores energy. The switching elements 641 to 644 each having a diode are provided at four positions near respective ends of the H-shaped step up/down circuit 630.

Of the switching elements 641 to 644 in the step up/down circuit 630, the switching elements at certain positions are turned on and the switching elements at the remaining positions are turned off to provide an operating state of the step up/down circuit 630. Thus, the current passed to the reactor 631 is ensured to be regulated to thereby regulate the voltage of the electrical power rectified by the rectifier circuit 620. The switching elements 641 to 644 are turned on/off under the control of the control unit 670.

The step up/down circuit 630 includes the relay 662a serially connected to the reactor 631. The step up/down circuit 630 is activated or deactivated with the turning on/off of the relay 662a. The relay 662a is turned on/off under the control of the control unit 670.

The primary resonance circuit 650 generates self-induction electromotive force with the electrical power rectified by the rectifier circuit 620. For example, as shown in FIG. 12 or 13, with the generation of the self-induction electromotive force, the primary resonance circuit 650 serves as a transformer that enables non-contact power supply to a battery (e.g., vehicle battery 720) having the secondary resonance circuit 730. Thus, in a state of being non-contacted with the secondary resonance circuit 730, the primary resonance circuit 650 is able to supply electrical power to the vehicle battery 720 connected to the secondary resonance circuit 730.

The primary resonance circuit 650 has a shape of an "H" to constitute a circuit in which the high-potential side is allowed to be electrically continuous using a power line, with a primary coil 651 and a capacitor 652 being provided at the center of the shape of an "H". The primary coil 651 and the capacitor 652 are connected in series. The primary coil 651 induces a magnetic field with supplied current. The capacitor 652 serves as a compensation component of an inductance of the primary coil 651. The switching elements 641 to 644 each having a diode are provided at four positions near respective ends of the H-shaped primary resonance circuit 650.

Of the four switching elements 641 to 644 in the primary resonance circuit 650, the diagonally located switching elements 641 and 644 are paired and, similarly, the switching elements 642 and 643 are paired. The pair of switching elements 641 and 644 and the pair of switching elements 642 and 643 are alternately turned on/off at high speed. With the alternate high-speed turning on/off, the operating state of the primary resonance circuit 650 is controlled for the primary coil 651 to generate self-induction electromotive force. The switching elements 641 to 644 are switched on/off under the control of the control unit 670.

In the present embodiment, the switching elements 641 to 644 commonly configure the step up/down circuit 630 and the primary resonance circuit 650, or the switching elements 641 to 644 are shared between the two circuits 630 and 650. Both of the step up/down circuit 630 and the primary resonance circuit 650 are ensured to be operated with the turning on/off of the switching elements 641 to 644.

The primary resonance circuit 650 includes the relay 662b which is connected in series with the primary coil 651 and the capacitor 652. The primary resonance circuit 650 has a high-potential side on which the relay 662c is provided. When the relays 662b and 662c are turned on/off, the primary resonance circuit 650 is activated or deactivated. The relays 662b and 662c are turned on/off under the control of the control unit 670.

The relay 662a of the step up/down circuit 630 and the relay 662b of the primary resonance circuit 650 correspond to the operation transfer relays of the present invention, which switch the operation between these circuits 630 and 650.

The secondary resonance circuit 730 supplies electrical power in a non-contacting manner to the vehicle battery 720 together with the primary resonance circuit 650. As shown in FIG. 12 or 13, the secondary resonance circuit 730 has a configuration in which a secondary coil 731 and a capacitor 732 are connected in parallel. The secondary resonance circuit 730 serves as a transformer. Specifically, when the secondary resonance circuit 730 is located near the primary resonance circuit 650 while the latter circuit induces electromotive force, the former circuit also induces electromotive force similar to the latter. Between the secondary resonance circuit 730 and the vehicle battery 720, a rectifier circuit 740 and relays 665a and 665b are arranged in this order from the side of the secondary resonance circuit 730. When the relays 665a and 665b are turned on/off, the secondary resonance circuit 730 and the vehicle battery 720 are ensured to be connected or disconnected. The relays 665a and 665b are turned on/off under the control of the control unit 670.

The step up/down circuit 630 includes output parts 630A and 630B. An end of a power line 681 is connected to the output part 630A. Similarly, an end of a power line 682 is connected to the output part 630B. Each of the power lines 681 and 682 has the other end connected to the residential battery 710.

The relay 663a is provided midway of the power line 681, while the relay 663b is provided midway of the power line 682. When the relays 663a and 663b are turned on/off, the step up/down circuit 630 and the residential battery 710 are connected or disconnected. The relays 663a and 663b are turned on/off under the control of the control unit 670.

Figure 14:
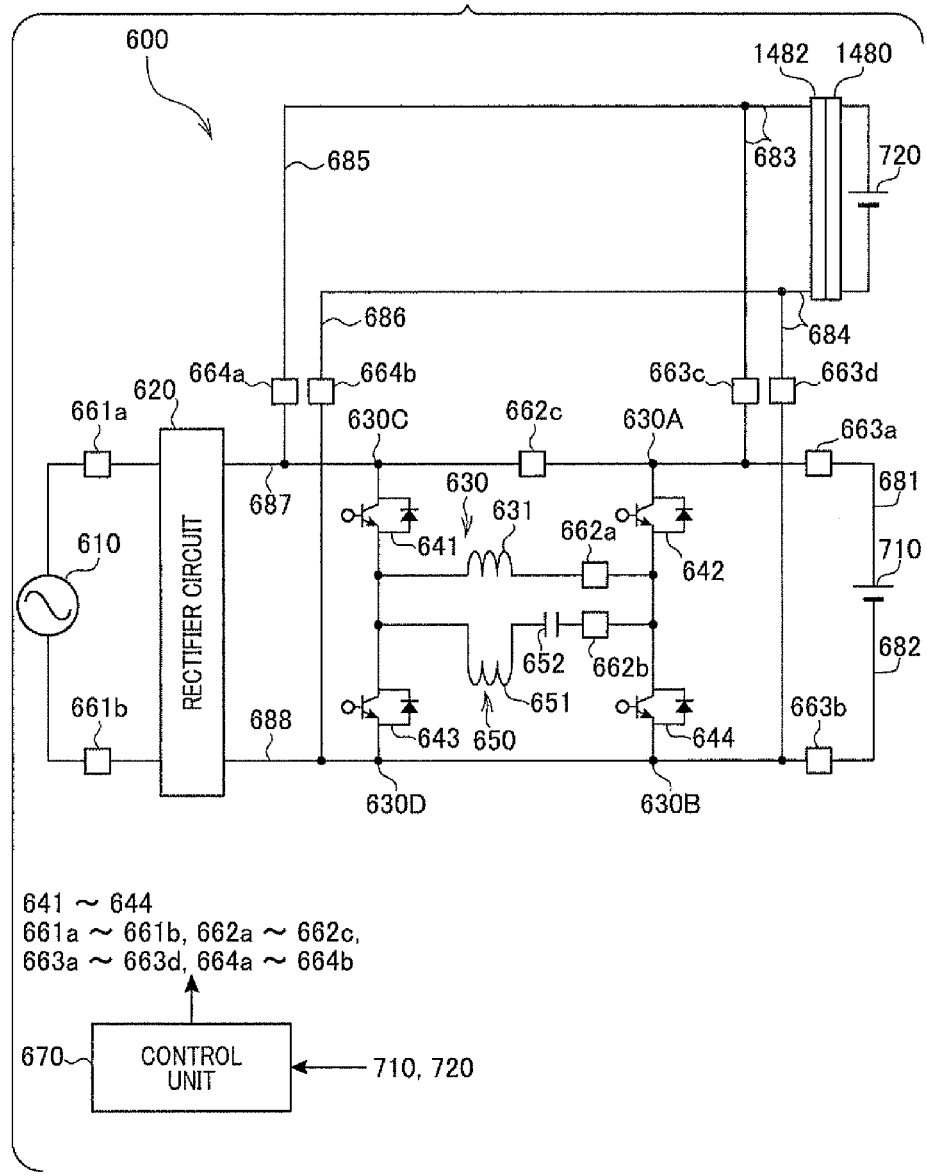
FIG. 14 is a circuit diagram illustrating a mode of connection between a vehicle battery and a step up/down circuit.

The power line 681 has a power line 683 which is branched from the power line 681, i.e. branched from a position between the output part 630A and the relay 663a. Similarly, the power line 682 has a power line 684 which is branched from the power line 682, i.e. branched from a position between the output part 630B and the relay 663b. The branched power lines 683 and 684 each have an end which is connectable to the vehicle battery 720. In other words, an end of each of the power lines 683 and 684 is provided such as with a connector that can be connected to or disconnected from the vehicle battery 720 as required. For example, as shown in FIG. 14, the vehicle battery 720 can be connected to the step up/down circuit 630 via a connector 980 and a plug 982. In this case, the range covering from the connector 980 to the vehicle battery 720 is included in the vehicle side, while the range covering from the plug 982 to the step up/down circuit 630 is included in the ground side. The plug 982 and the connector 980 may be connected based on a standardized mode (e.g., see CHAdeMo protocol of Japan). The connecting state of the power lines 683 and 684 (plug 982) with respect to the vehicle battery 720 (connector 980) can be recognized by the control unit 670.

The relay 663c is provided midway of the power line 683, while the relay 663d is provided midway of the power line 684. When the relays 663c and 663d are turned on/off, the step up/down circuit 630 and the vehicle battery 720 are connected or disconnected. The relays 663c and 663d are turned on/off under the control of the control unit 670.

The relays 663a and 663b of the power lines 681 and 682, respectively, and the relays 663c and 663d of the power lines 683 and 684, respectively, correspond, in the present invention, to the power supply switching relays that switch electrical power supply between a supply line from the step up/down circuit 630 to the residential battery 710, and a supply line from the step up/down circuit 630 to the vehicle battery 720.

The rectifier circuit 620 and the step up/down circuit 630 are connected on the high-potential side thereof via a power line 687. The power line 687 has a power line 685 branched midway from the power line 687. Also, the rectifier circuit 620 and the step up/down circuit 630 are connected on the low-potential side thereof via a power line 688. The power line 688 has a power line 686 branched midway from the power line 688. The branched power line 685 has an end connected to the power line 683, i.e. connected to a position between the vehicle battery 720 and the relay 663c. Similarly, the branched power line 686 has an end connected to the power line 684, i.e. connected to a position between the vehicle battery 720 and the relay 663d.

The relay 664a is provided midway of the power line 685, while the relay 664b is provided midway of the power line 686. The step up/down circuit 630 includes input parts 630C and 630D. When the relays 664a and 664b are turned on/off, the input parts 630C and 630C of the step up/down circuit 630 are connected to or disconnected from the vehicle battery 720. The relays 664a and 664b are turned on/off under the control of the control unit 670.

The relays 664a and 664b of the power lines 685 and 686, respectively, correspond, in the present invention, to the power supply on/off relays that switch connection and disconnection at the midway positions of the respective power lines 685 and 686.

Thus, the control unit 670 turns on/off the switching elements 641 to 644 as well as the relays 661a, 661b, 662a to 662c, 663a to 663d, 664a, 664b, 665a and 665b. In this way, the control unit 670 controls the supply of electrical power to the residential battery 710 or the vehicle battery 720 from the AC power supply 610, controls the non-contact power supply using the primary resonance circuit 650, and controls the supply of electrical power between the residential battery 710 and the vehicle battery 720.

Upon reception of an instruction from the user, the control unit 670 starts supply of power and stops supply of power based on the state of charge of the battery 710 or 720. Alternatively, the control unit 670 prepares a power-supply schedule based on power-supply requirements (e.g., the time of completing power supply) from the user and also based on the state of charge of the battery 710 or 720. Then, the control unit 670 starts and stops supply of power according to the prepared schedule.

Referring now to FIGS. 9 to 13, hereinafter are described the operation of the power supply system 600 configured as described above and advantages of the power supply system 600. The control unit 670 is enabled various power supply modes as set forth below. In each of FIGS. 9 to 13, the thick solid line indicates a circuit portion activated by the relays.

Figure 9:
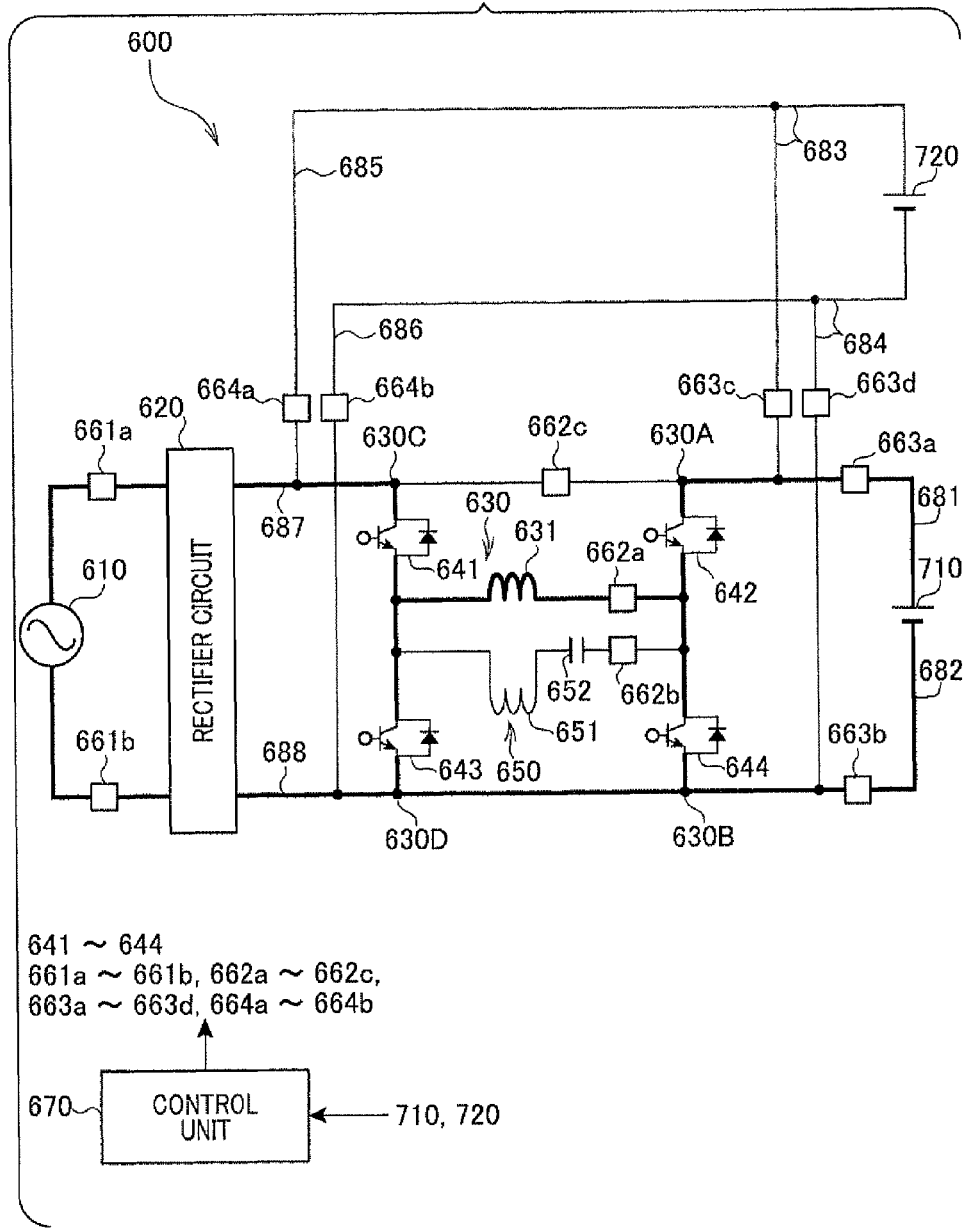
FIG. 9 is a circuit diagram illustrating a state of contact power supply from an AC power supply to a residential battery.

FIG. 9 is a circuit diagram illustrating a state of contact power supply from the AC power supply 600 to the residential battery 710. As shown in FIG. 9, the control unit 670 turns on the relays 661a and 661b to electrically connect between the AC power supply 610 and the rectifier circuit 620. Also, the control unit 670 turns on the relay 662a and turns off the relays 662b and 662c, so that, of the step up/down circuit 630 and the primary resonance circuit 650, the former is activated. Further, the control unit 670 turns on the relays 663a and 663b and turns off the relays 663c and 663d, so that, of the residential battery 710 and the vehicle battery 720, the former is electrically connected to the step up/down circuit 630. Furthermore, the control unit 670 turns off the relays 664a and 664b so that the power lines 685 and 686 are disconnected from the power lines 687 and 688, respectively.

When the relays are turned on/off as mentioned above in the power supply system 600, the AC power supply 610, the rectifier circuit 620, the step up/down circuit 630 and the residential battery 710 are sequentially electrically connected. Thus, the AC power supplied from the AC power supply 610 is rectified by the rectifier circuit 620. Meanwhile, the control unit 670 turns on/off the switching elements 641 to 644 to have the step up/down circuit 630 regulated the voltage. Thus, the electrical power, with its voltage being regulated, is supplied to the residential battery 710 for the charge of the residential battery 710.

Figure 10:
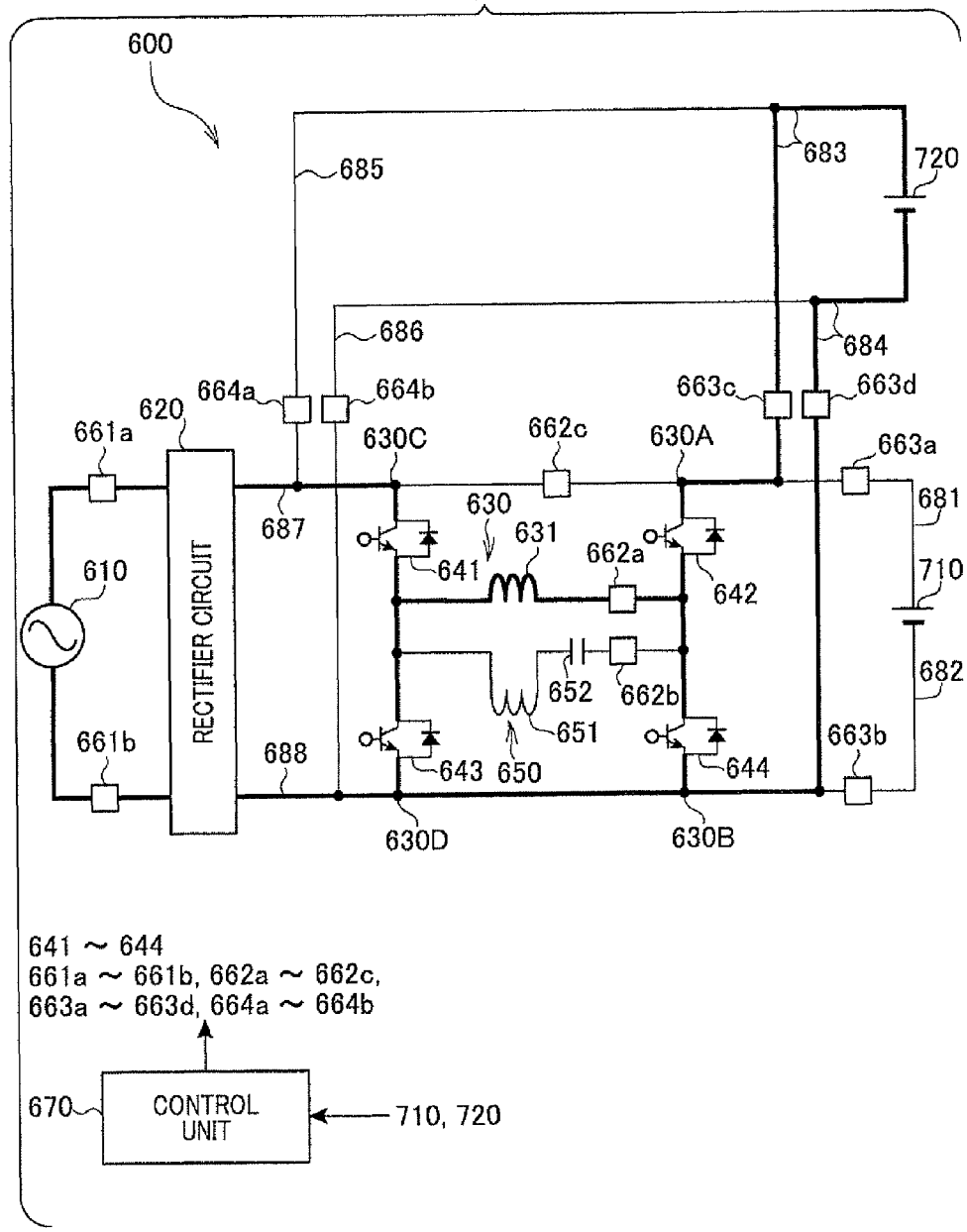
FIG. 10 is a circuit diagram illustrating a state of contact power supply from an AC power supply to a vehicle battery.

FIG. 10 is a circuit diagram illustrating a state of contact power supply from the AC power supply 610 to the vehicle battery 720. As shown in FIG. 10, the control unit 670 turns on the relays 661a and 661b to electrically connect between the AC power supply 610 and the rectifier circuit 620. Then, the control unit 670 turns on the relay 662a and turns off the relays 662b and 662c, so that, of the step up/down circuit 630 and the primary resonance circuit 650, the former is activated. Further, the control unit 670 turns on the relays 663c and is 663d and turns off the relays 663a and 663b, so that, of the residential battery 710 and the vehicle battery 720, the latter is electrically connected to the step up/down circuit 630. Furthermore, the control unit 670 turns off the relays 664a and 664 so that the power lines 685 and 686 are disconnected from the power lines 687 and 688, respectively.

When the relays are turned on/off as mentioned above in the power supply system 600, the AC power supply 610, the rectifier circuit 620 and the step up/down circuit 630 are sequentially electrically connected. When the user connects the connector at the ends of the power lines 683 and 684 to the vehicle battery 720, the AC power supply 610, the rectifier circuit 620, the step up/down circuit 630 and the vehicle battery 720 are sequentially electrically connected. In this case, the control unit 670 recognizes the connecting state of the connector. Thus, the AC power supplied from the AC power supply 610 is rectified by the rectifier circuit 620. Meanwhile, the control unit 670 turns on/off the switching elements 641 to 644 to have the step up/down circuit 630 regulated voltage. Thus, the electrical power, with its voltage being regulated, is supplied to the vehicle battery 720 for the charge of the vehicle battery 720.

Figure 11:
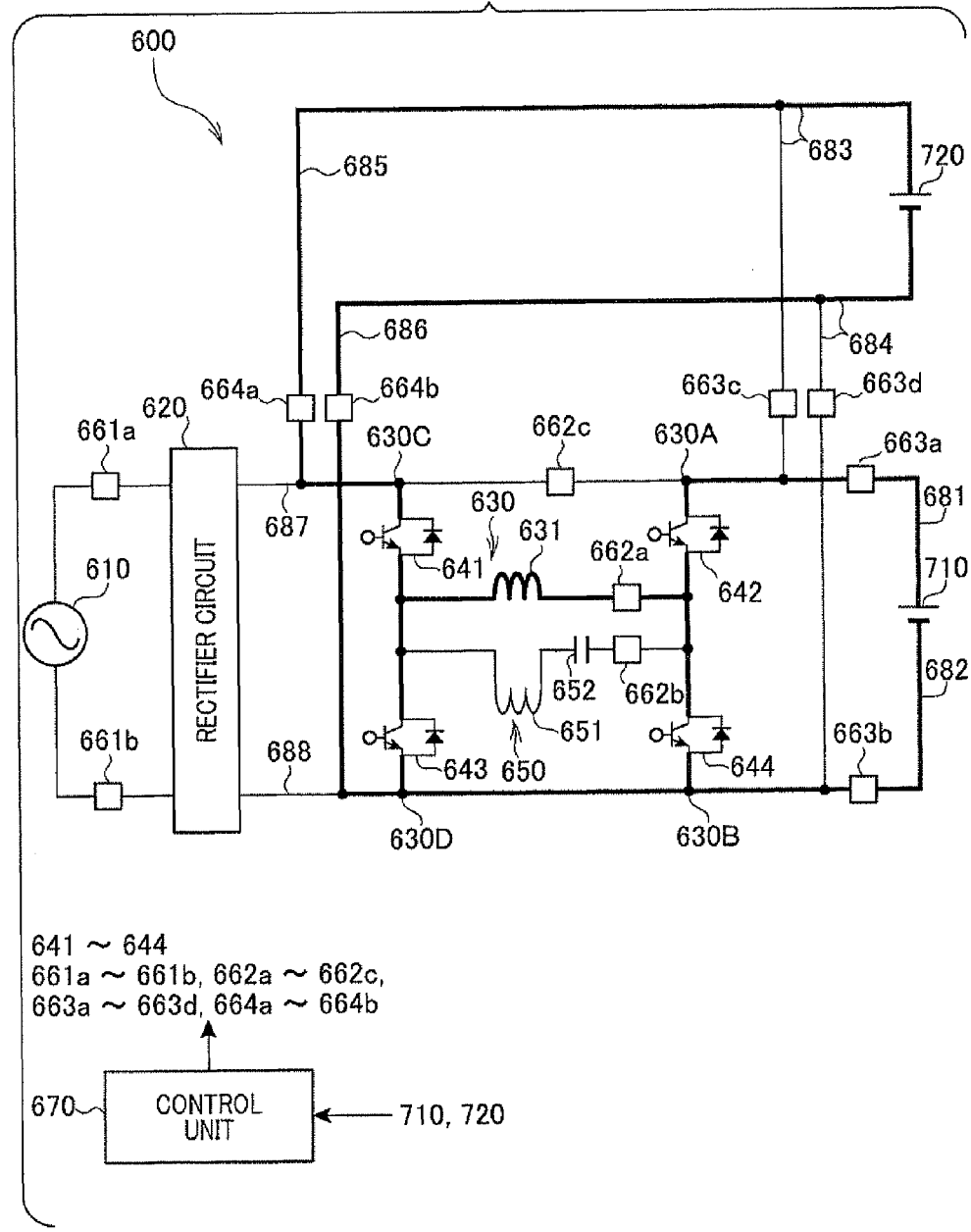
FIG. 11 is a circuit diagram illustrating a state of contact power supply between a residential battery and a vehicle battery.

FIG. 11 is a circuit diagram illustrating a state of non-contact power supply between the residential battery 710 and the vehicle battery 720. As shown in FIG. 11, the control unit 670 turns off the relays 661a and 661b to electrically disconnect between the AC power supply 610 and the rectifier circuit 620. Also, the control unit 670 turns on the relay 662a and turns off the relays 662b and 662c, so that, of the step up/down circuit 630 and the primary resonance circuit 650, the former is activated. Further, the control unit 670 turns on the relays 663a and 663b and turns off the relays 663c and 663d, so that, of the residential battery 710 and the vehicle battery 720, the former is connected to the step up/down circuit 630. Furthermore, the control unit 670 turns on the relays 664a and 664b so that the power lines 685 and 686 are connected to the power lines 687 and 688, respectively. When the connector at the ends of the power lines 683 and 684 is connected to the vehicle battery 720 by the user during the on-state of the relays 664a and 664b, the vehicle battery 720 is connected to the input parts 630C and 630D of the step up/down circuit 630.

Turning on/off the relays and connecting the connector to the plug in the power supply system 600, the residential battery 710, the step up/down circuit 630 and the vehicle battery 720 are sequentially electrically connected. Meanwhile, turning on/off the switching elements 641 to 644, the control unit 670 allows the step up/down circuit 630 to regulate voltage. In this way, electrical power is supplied between the residential battery 710 and the vehicle battery 720. The control unit 670 carries out power supply from a battery having a larger amount of charge to a battery having a smaller amount of charge. For example, upon reception of a request to supply power to the vehicle battery 720, the control unit 670 carries out power supply from the residential battery 710 to the vehicle battery 720. Contrarily, under the condition where the electrical power consumed in the residential house is increased causing a decrease the amount of charge in the residential battery 710, the control unit 670 carries out power supply from the vehicle battery 720 to the residential battery 710.

FIG. 12 is a circuit diagram illustrating a state of non-contact power supply from the AC power supply 610. As shown in FIG. 12, the control unit turns on the relays 661a and 661b to electrically connect between the AC power supply 610 and the rectifier circuit 620. Also, the control unit 670 turns on the relays 662b and 662c and turns off the relay 662a, so that, of the step up/down circuit 630 and the primary resonance circuit 650, the latter is activated. Further, the control unit 670 turns off the relays 663a to 663d so that both of the residential battery 710 and the vehicle battery 720 are disconnected from the step up/down circuit 630 and the primary resonance circuit 650. Furthermore, the control unit 670 turns off the relays 664a and 664b to disconnect the power lines 685 and 686 from the power lines 687 and 688, respectively. Then, the control unit 670 turns on the relays 665a and 665b to electrically connect the secondary resonance circuit 730 to the vehicle battery 720. In this case, the secondary resonance circuit 730 is placed closely to the primary resonance 650 in a non-contacting manner so as to be ready for power supply.

When the relays are turned on/off as described above in the power supply system 600, the AC power supply 610, the rectifier circuit 620 and the primary resonance circuit 650 are sequentially electrically connected. Thus, the AC power supplied from the AC power supply 610 is rectified by the rectifier circuit 620. Meanwhile, the control unit 670 turns on/off the switching elements 641 to 644 so that self-induction electromotive force is generated in the primary coil 651 of the primary resonance circuit 650. Thus, self-induction electromotive force is also generated in the secondary resonance circuit 730, which is rectified by the rectifier circuit 740. In this way, non-contact power supply is conducted from the primary resonance circuit 650 to the vehicle battery 720 for the charge of the vehicle battery 720.

FIG. 13 is a circuit diagram illustrating a state of non-contact power supply from the residential battery 710. As shown in FIG. 13, the control unit 670 turns off the relays 661a and 661b to electrically disconnect between the AC power supply 610 and the rectifier circuit 620. Also, the control unit 670 turns on the relays 662b and 662c and turns off the relay 662a, so that, of the step up/down circuit 630 and the primary resonance circuit 650, the latter is activated. Further, the control unit 670 turns on the relays 663a and 663b and turns off the relays 663c and 663d, so that, of the residential battery 710 and the vehicle battery 720, the former is electrically connected to the primary resonance circuit 650. Furthermore, the control unit 670 turns off the relays 664a and 664b to electrically disconnect the power lines 685 and 686 from the power lines 687 and 688, respectively. Then, the control circuit 670 turns on the relays 665a and 665b so that the secondary resonance circuit 730 is electrically connected to the vehicle battery 720. In this case, the secondary resonance circuit 730 is placed closely to the primary resonance 650 in a non-contacting manner so as to be ready for power supply.

When the relays are turned on/off as described above in the power supply system 600, the residential battery 710 and the primary resonance circuit 650 are sequentially electrically connected. Thus, the DC power supplied from the residential battery 710 reaches the primary resonance circuit 650. Meanwhile, the control unit 670 turns on/off the switching elements 641 to 644 so that self-induction electromotive force is generated in the primary coil 651 of the primary resonance circuit 650. Thus, self-induction electromotive force is also generated in the secondary resonance circuit 730, which is rectified by the rectifier circuit 740. In this way, non-contact power supply is conducted from the primary resonance circuit 650 to the vehicle battery 720 for the charge of the vehicle battery 720.

As described above, in the present embodiment, the control unit 670 turns on/off the relays 661a, 661b, 662a to 662d, 663a to 663d, 664a, 664b, 665a and 665b. At the same time, the control unit 670 turns on/off the switching elements 641 to 644. Thus, the various power supply modes as set forth above are available. It should be appreciated that the modes described referring to FIGS. 9 to 11 are based on contact power supply, while the modes described referring to FIGS. 12 and 13 are based on non-contact power supply.

As described above, the switching elements 641 to 644 as components of the system are shared between the step up/down circuit 630 and the primary resonance circuit 650 to provide either the circuit 630 or 650. Accordingly, the size and cost of the power supply system 600 are reduced.

(Modifications)

Figure 15:
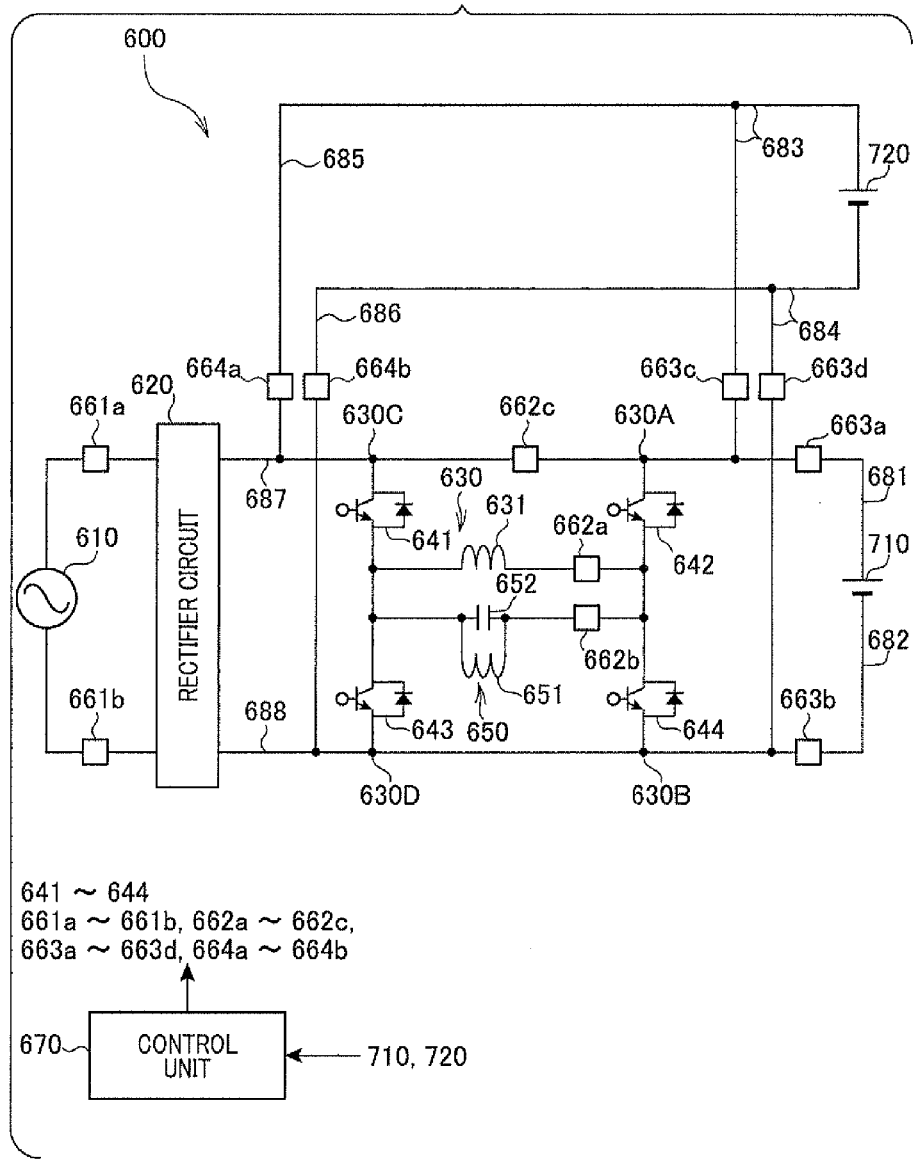
FIG. 15 is a circuit diagram illustrating a power supply system in another embodiment.

In the embodiment described above, the primary coil and the capacitor 652 of the primary resonance circuit 650 are connected in series. However, no limitation should be imposed by this. For example, as shown in FIG. 15, the primary coil 651 and the capacitor 652 may be connected in parallel to form a primary resonance circuit 650A.

As described above, the power supply system 600 of the present invention at least includes the AC power supply 610, rectifier circuit 620, step up/down circuit 630, switching elements 641 to 644, primary resonance circuit 650, relays 662a to 662c and control unit 670. This configuration enables, for example, contact power supply (the power supply mode described referring to FIG. 9) for the residential battery 710. Alternatively, for example, this configuration enables non-contact power supply (the power supply mode described referring to FIG. 12) for the vehicle battery 720 that includes the secondary resonance circuit 730. Thus, the following Modifications 1 to 4 are also available.

(Modification 1)

The power supply system 600 of the above embodiment may be removed with the power supply lines 683 to 686 as well as the relays 661a, 661b, 663a to 663d, 664a and 664b. In this case, the power supply modes described referring to FIGS. 9 and 12 in the above embodiment are available.

(Modification 2)

The power supply system 600 of the above embodiment may be removed with the power lines 685 and 686 as well as the relays 661a, 661b, 664a and 664b. In this case, the power supply modes described referring to FIGS. 9, 10 and 12 in the above embodiment are available.

(Modification 3)

The power supply system 600 of the above embodiment may be removed with the power lines 683 and 684 as well as the relays 663a to 663d. In this case, the power supply modes described referring to FIGS. 9, 11 and 12 in the above embodiment are available.

(Modification 4)

The power supply system 600 of the above embodiment may be removed with the power lines 683 to 136 as well as the relays 663a to is 663d, 664a and 664b. In this case, the power supply modes described referring to FIGS. 9, 12 and 13 in the above embodiment are available.

Alternatively, instead of the control unit 670, a vehicle control unit installed in the vehicle may be connected to the power supply system 600 via communication links, for the control of the power supply system 600 with the instructions issued from the vehicle control unit.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A power supply apparatus for vehicles, comprising:
a battery mounted on a vehicle;
first power transferring means comprising a connector for transferring power between the battery and a first power supply section placed outside the vehicle when the battery is electrically connected to the first power supply section through the connector and a charger-side connector is connected to the first power supply section, the connector being disposed in an opening of the vehicle that is opened and closed with a charging lid;
second power transferring means for transferring power between the battery and a second power supply section placed outside the vehicle when the battery is electromagnetically connected to the second power supply section;
a power conversion unit used commonly in both the first and second power transferring means and used for transferring the power between the battery and the first power supply section and for transferring the power between the battery and the second power supply section; and
a control section for controlling transferring of power through the first power transferring means and the second power transferring means, the control section being configured to:
detect whether the connector connected to the first power transferring means is electrically connected to the charger-side connector connected to the first power supply section,
stop power transfer through the second power transferring means in response to detecting the electrical connection between the connector and the charger-side connector during the power transfer through the second power transferring means,
after stopping the power transfer through the second power transferring means, allow the power conversion unit and the first power transferring means to transfer power from the first power supply section to the battery, and
stop the power transfer through the second power transferring means and instruct the first power transferring means to be ready to transfer power from the first power supply section to the battery based on a detection that at least one of the charging lid and a vehicle door is opened during the power transfer through the second power transferring means.

2. The power supply apparatus of claim 1, wherein the power conversion unit is configured to interactively transfer the power from the battery to each of the first and second power supply sections and from each of the first and second power supply sections to the battery.

3. The power supply apparatus of claim 2, wherein the vehicle is provided with a motor section driven by power of which mode is converted from the power of the battery, and the power conversion unit is used in common to convert the mode of the power of the battery.

4. The power supply apparatus of claim 3, wherein the control section is configured to further detect that the first power transferring means has electrically disconnected the battery from the first power supply section during an operation of the first power transferring means,
the control section is configured to stop the operation of the first power transferring means and is configured to allow the second power supply section to operate when detecting the electrical disconnection between the battery and the first power supply section.

5. The power supply apparatus of claim 4, further comprising a display that displays operation states of the first and second power transferring means,
wherein the control section is configured to control the display to show which of the first or second power transferring means is in operation, depending on which of the first and second power transferring means is currently being controlled by the control section.

6. The power supply apparatus of claim 5, wherein the display is provided on a part of the vehicle.

7. The power supply apparatus of claim 1, wherein the vehicle is provided with a motor section driven by power of which mode is converted from the power of the battery, and the power conversion unit is used in common to convert the mode of the power of the battery.

8. The power supply apparatus of claim 7 wherein the control section is configured to further detect that the first power transferring means has electrically disconnected the battery from the first power supply section during an operation of the first power transferring means, and
the control section is configured to stop the operation of the first power transferring means and is configured to allow the second power supply section to operate when detecting the electrical disconnection between the battery and the first power supply section.

9. The power supply apparatus of claim 8, further comprising a display that displays operation states of the first and second power transferring means,
wherein the control section controls the display to show which of the first or second power transferring means is in operation, depending on which of the first and second power transferring means is currently being controlled by the control section.

10. The power supply apparatus of claim 9, wherein the display is provided on a part of the vehicle.

11. The power supply apparatus of claim 1, wherein the second power transferring means is a non-contact power transfer unit, and
the power supply apparatus initially supplies power from the second power supply section to the battery through the second power transferring means.

12. A power supply apparatus for vehicles, comprising
a battery mounted on a vehicle;
first power transferring means comprising a connector for transferring power between the battery and a first power supply section placed outside the vehicle when the battery is electrically connected to the first power supply section through the connector and a charger-side connector is connected to the first power supply section,
the connector being disposed in an opening of the vehicle that is opened and closed with a charging lid;
second power transferring means for transferring power between the battery and a second power supply section placed outside the vehicle when the battery is electromagnetically connected to the second power supply section; and
a control section that controls the first and second power transferring means, the control section being configured to:
detect whether the connector connected to the first power transferring means is electrically connected to the charger-side connector connected to the first power supply section,
stop power transfer through the second power transferring means in response to detecting the electrical connection between the connector and the charger-side connector during the power transfer through the second power transferring means,
after stopping the power transfer through the second power transferring means, allow the first power transferring means to transfer power from the first power supply section to the battery, and
stop the power transfer through the second power transferring means and instruct the first power transferring means to be ready to transfer power from the first power supply section to the battery based on a detection that at least one of the charging lid and a vehicle door is opened during the power transfer through the second power transferring means.

13. The power supply apparatus of claim 12, wherein the control section further detects that the first power transferring means has electrically disconnected the battery from the first power supply section during an operation of the first power transferring means, and
stops the operation of the first power transferring means and allows the second power supply section to operate when detecting the electrical disconnection between the battery and the first power supply section.

14. The power supply apparatus of claim 12, further comprising:
a first power conversion unit capable of transferring the power between the battery and the first power supply section through the first power transferring means under the control of the control section; and
a second power conversion unit capable of transferring the power between the battery and the second power supply section through the second power transferring means under the control of the control section.

* * * * *